(12) United States Patent
Bhoria et al.

(10) Patent No.: US 11,709,677 B2
(45) Date of Patent: *Jul. 25, 2023

(54) LOOK-UP TABLE INITIALIZE

(71) Applicant: TEXAS INSTRUMENTS INCORPORATED, Dallas, TX (US)

(72) Inventors: Naveen Bhoria, Plano, TX (US); Dheera Balasubramanian Samudrala, Richardson, TX (US); Duc Bui, Grand Prairie, TX (US); Rama Venkatasubramanian, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,482

(22) Filed: Jan. 18, 2022

(65) Prior Publication Data
US 2022/0137970 A1 May 5, 2022

Related U.S. Application Data

(63) Continuation of application No. 16/570,778, filed on Sep. 13, 2019, now Pat. No. 11,226,822.

(Continued)

(51) Int. Cl.
*G06F 9/30* (2018.01)
*G11C 11/409* (2006.01)
(Continued)

(52) U.S. Cl.
CPC ........ *G06F 9/30145* (2013.01); *G06F 9/3001* (2013.01); *G06F 9/30007* (2013.01); *G06F 9/30043* (2013.01); *G06F 9/30101* (2013.01); *G06F 9/30105* (2013.01); *G06F 9/3818* (2013.01); *G06F 9/44505* (2013.01); *G06F 12/0246* (2013.01); *G06F 12/0292* (2013.01);
(Continued)

(58) Field of Classification Search
CPC ............ G06F 9/30145; G06F 9/30007; G06F 9/30105
See application file for complete search history.

(56) References Cited

U.S. PATENT DOCUMENTS 11,226,822 B2 * 1/2022 Bhoria ................. G11C 11/409
2016/0124651 A1 5/2016 Sankaranarayanan et al.
2017/0344369 A1 11/2017 Cho et al.

* cited by examiner

*Primary Examiner* — Zachary K Huson
(74) *Attorney, Agent, or Firm* — Brian D. Graham; Frank D. Cimino

(57) ABSTRACT

A digital data processor includes an instruction memory storing instructions specifying a data processing operation and a data operand field, an instruction decoder coupled to the instruction memory for recalling instructions from the instruction memory and determining the operation and the data operand, and an operational unit coupled to a data register file and to an instruction decoder to perform a data processing operation upon an operand corresponding to an instruction decoded by the instruction decoder and storing results of the data processing operation. The operational unit is configured to perform a table write in response to a look up table initialization instruction by duplicating at least one data element from a source data register to create duplicated data elements, and writing the duplicated data elements to a specified location in a specified number of at least one table and a corresponding location in at least one other table.

20 Claims, 27 Drawing Sheets

Related U.S. Application Data

(60) Provisional application No. 62/853,120, filed on May 27, 2019.

(51) Int. Cl.
*G06F 12/02* (2006.01)
*G06F 16/31* (2019.01)
*G06F 16/901* (2019.01)
*G06F 16/41* (2019.01)
*G06F 9/445* (2018.01)
*G06F 9/38* (2018.01)
*G06F 12/0811* (2016.01)
*G06F 3/06* (2006.01)
*G06F 9/355* (2018.01)

(52) U.S. Cl.
CPC ............ *G06F 16/322* (2019.01); *G06F 16/41* (2019.01); *G06F 16/9017* (2019.01); *G11C 11/409* (2013.01); *G06F 3/0647* (2013.01); *G06F 9/30167* (2013.01); *G06F 9/355* (2013.01); *G06F 12/0811* (2013.01)

| 63 — 27 | 26 25 | 24 23 | 16 | 15 | 14 13 | 11 10 | 8 | 7 | 6 | 5 | 3 2 | 0 |
|---|---|---|---|---|---|---|---|---|---|---|---|---|
| RESERVED | PROMO | TABLE SIZES | | RESERVED | WSIZE | INTERPOLATION | | SAT | SIGNED | ESIZE | | NTBL |

- 1901 PROMO
- 1902 TABLE SIZES
- 1903 WSIZE
- 1904 INTERPOLATION
- 1905 SAT
- 1906 SIGNED
- 1907 ESIZE
- 1908 NTBL

| 63 — 17 | 16 | 15 | 14 13 | 12 11 | 10 9 | 8 7 | 6 5 | 4 3 | 2 1 | 0 |
|---|---|---|---|---|---|---|---|---|---|---|
| RESERVED | | RESERVED | LUTE3 | RESERVED | LUTE2 | RESERVED | LUTE1 | RESERVED | LUTE0 | |

- 2001 LUTE3
- 2002 LUTE2
- 2003 LUTE1
- 2004 LUTE0

LOOK-UP TABLE INITIALIZE

CROSS-REFERENCE TO RELATED APPLICATIONS

The present application is a continuation of U.S. patent application Ser. No. 16/570,778, filed Sep. 13, 2019, which claims priority to U.S. Provisional Patent Application No. 62/853,120, filed May 27, 2019, each of which is incorporated by reference herein in its entirety.

The present application relates to the following commonly assigned co-pending applications titled: "Look-Up Table Write," U.S. patent application Ser. No. 16/570,519, filed Sep. 13, 2019; "Look-Up Table Read," U.S. patent application Ser. No. 16/570,640, filed Sep. 13, 2019; "Look-Up Table Read," U.S. patent application Ser. No. 16/570,874, filed Sep. 13, 2019; and "Histogram Operation," U.S. patent application Ser. No. 16/570,931, filed Sep. 13, 2019, each of which is incorporated by reference herein in its entirety.

BACKGROUND

Modern digital signal processors (DSP) face multiple challenges. Workloads continue to increase, requiring increasing bandwidth. Systems on a chip (SOC) continue to grow in size and complexity. Memory system latency severely impacts certain classes of algorithms. As transistors get smaller, memories and registers become less reliable. As software stacks get larger, the number of potential interactions and errors becomes larger. Even wires become an increasing challenge. Wide busses are difficult to route. Wire speeds continue to lag transistor speeds. Routing congestion is a continual challenge.

One technique useful for filtering functions is table look up. A data table is loaded into memory storing a set of results at a memory location corresponding to an input parameter. To perform a function, the input parameter is used to recall the pre-calculated result. This technique can be particularly valuable for seldom used and difficult to calculate mathematical functions.

SUMMARY

In accordance with at least one example of the disclosure, a digital data processor includes an instruction memory storing instructions specifying a data processing operation and a data operand field, an instruction decoder coupled to the instruction memory for recalling instructions from the instruction memory and determining the operation and the data operand, and an operational unit coupled to a data register file and to an instruction decoder to perform a data processing operation upon an operand corresponding to an instruction decoded by the instruction decoder and storing results of the data processing operation. The operational unit is configured to perform a table write in response to a look up table initialization instruction by duplicating at least one data element from a source data register to create duplicated data elements, and writing the duplicated data elements to a specified location in a specified number of at least one table and a corresponding location in at least one other table.

In accordance with another example of the disclosure, a method includes performing, by an operational unit coupled to a data register file and to an instruction decoder, a table write in response to a look up table initialization instruction by duplicating at least one data element from a source data register to create duplicated data elements, and writing the duplicated data elements to a specified location in a specified number of at least one table.

BRIEF DESCRIPTION OF THE DRAWINGS

For a detailed description of various examples, reference will now be made to the accompanying drawings in which:

FIG. 19 illustrates the data fields of an example look up table configuration register;

FIG. 20 illustrates the data fields in an example look up table enable register which specifies the type of operations permitted for a particular table set;

FIG. 21 illustrates look up table organization for one table for that table set;

FIG. 22 illustrates look up table organization for two tables for that table set;

DETAILED DESCRIPTION

Figure 1:
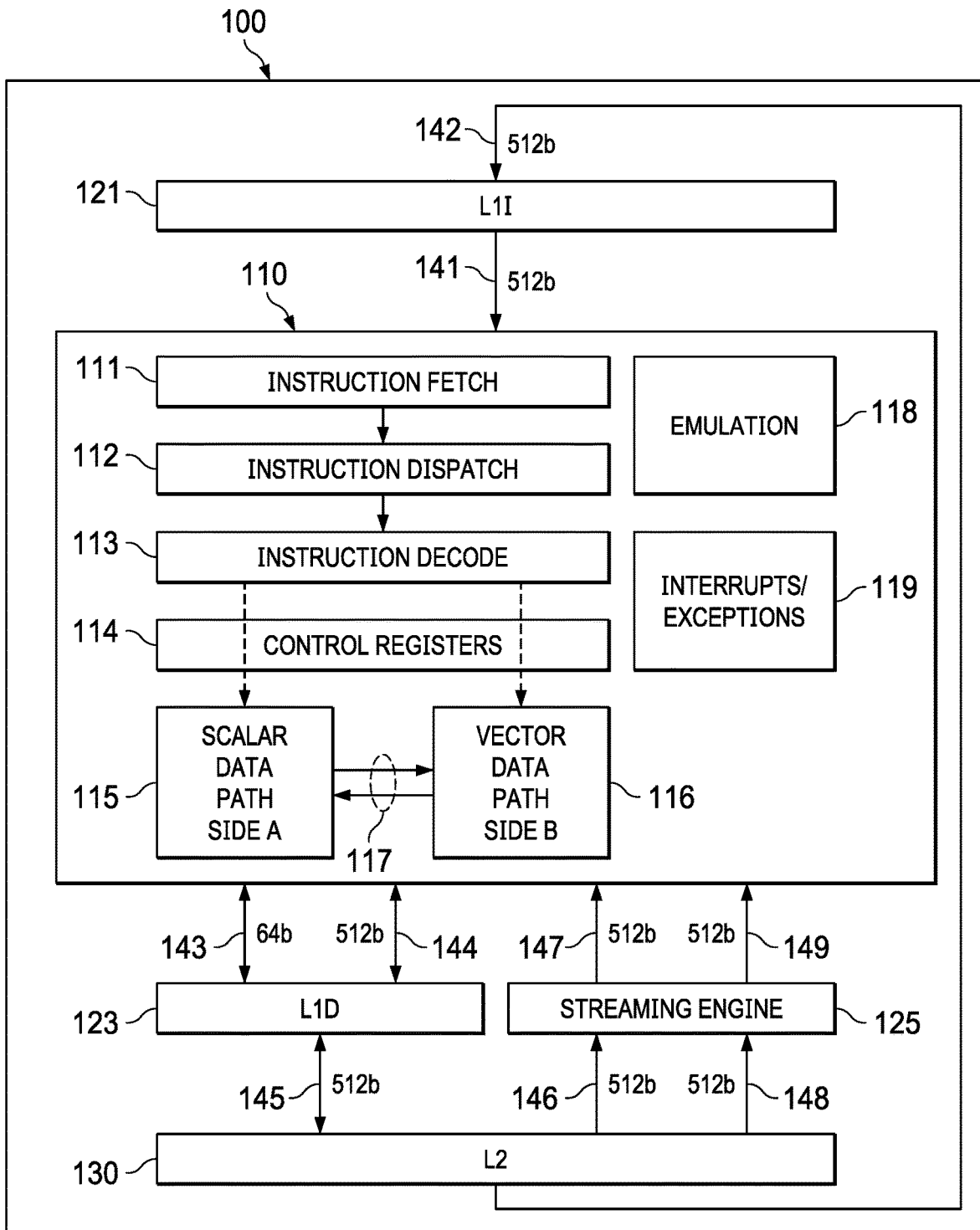
FIG. 1 illustrates a dual scalar/vector datapath processor according to one embodiment.

FIG. 1 illustrates a dual scalar/vector datapath processor 100 according to an example embodiment of this disclosure. Processor 100 includes separate level one instruction cache (L1I) 121 and level one data cache (L1D) 123. Processor 100 includes a level two combined instruction/data cache (L2) 130 that holds both instructions and data. FIG. 1 illustrates the connection between level one instruction cache 121 and level two combined instruction/data cache 130 (bus 142). FIG. 1 illustrates the connection between level one data cache 123 and level two combined instruction/data cache 130 (bus 145). The level two combined instruction/data cache 130 stores both instructions to back up level one instruction cache 121 and data to back up level one data cache 123. The level two combined instruction/data cache 130 is further connected to higher level cache and/or main memory in a manner known in the art and not illustrated in FIG. 1. In one embodiment, central processing unit core 110, level one instruction cache 121, level one data cache 123 and level two combined instruction/data cache 130 are formed on a single integrated circuit. This single integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. As known in the art, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In one embodiment, the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache (not illustrated) or from main memory (not illustrated). As is known in the art, the requested instruction may be simultaneously supplied to both level one instruction cache 121 and central processing unit core 110 to speed use.

Central processing unit core 110 includes plural functional units (also referred to as "execution units") to perform instruction specified data processing tasks. Instruction dispatch unit 112 determines the target functional unit of each fetched instruction. In one embodiment, central processing unit 110 operates as a very long instruction word (VLIW) processor capable of operating on plural instructions in corresponding functional units simultaneously. A compiler may organize instructions in execute packets that are executed together. Instruction dispatch unit 112 directs each instruction to its target functional unit. In one embodiment, the functional unit assigned to an instruction is completely specified by the instruction produced by a compiler in that the hardware of central processing unit core 110 has no part in this functional unit assignment. Instruction dispatch unit 112 may operate on plural instructions in parallel. The number of such parallel instructions is set by the size of the execute packet. This will be further detailed below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files, and identification of the register destination of the results of the corresponding data processing operation. As further explained below, instructions may include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116. This information could include mode information or the like.

The decoded instructions from instruction decode unit 113 and information stored in control registers 114 are supplied to scalar datapath side A 115 and vector datapath side B 116. As a result, functional units within scalar datapath side A 115 and vector datapath side B 116 perform instruction specified data processing operations upon instruction specified data and store the results in an instruction specified data register or registers. Each of scalar datapath side A 115 and vector datapath side B 116 includes plural functional units that may operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability will typically be employed for algorithmic development. Interrupts/exceptions unit 119 enables central processing unit core 110 to be responsive to external, asynchronous events (interrupts) and to respond to attempts to perform improper operations (exceptions).

Central processing unit core 110 includes streaming engine 125. Streaming engine 125 supplies two data streams from predetermined addresses typically cached in level two combined cache 130 to register files of vector datapath side B. This provides controlled data movement from memory (as cached in level two combined cache 130) directly to functional unit operand inputs. This is further detailed below.

FIG. 1 illustrates data widths of busses between various parts for an example embodiment. Level one instruction cache 121 supplies instructions to the instruction fetch unit 111 via bus 141. Bus 141 is a 512-bit bus in this example embodiment. Bus 141 is unidirectional from level one instruction cache 121 to central processing unit 110. Level two combined cache 130 supplies instructions to level one instruction cache 121 via bus 142. Bus 142 is a 512-bit bus in this example embodiment. Bus 142 is unidirectional from level two combined cache 130 to level one instruction cache 121.

Level one data cache 123 exchanges data with register files in scalar datapath side A 115 via bus 143. Bus 143 is a 64-bit bus in this example embodiment. Level one data cache 123 exchanges data with register files in vector datapath side B 116 via bus 144. Bus 144 is a 512-bit bus in this example embodiment. Busses 143 and 144 are illustrated as bidirectional supporting both central processing unit 110 data reads and data writes. Level one data cache 123 exchanges data with level two combined cache 130 via bus 145. Bus 145 is a 512-bit bus in this example embodiment. Bus 145 is illustrated as bidirectional supporting cache service for both central processing unit 110 data reads and data writes.

As known in the art, CPU data requests are directly fetched from level one data cache 123 upon a cache hit (if the requested data is stored in level one data cache 123). Upon a cache miss (the specified data is not stored in level one data cache 123), this data is sought in level two combined cache 130. The memory locations of this requested data is either a hit in level two combined cache 130 or a miss. A hit is serviced from level two combined cache 130. A miss is serviced from another level of cache (not illustrated) or from main memory (not illustrated). As is known in the art, the requested instruction may be simultaneously supplied to both level one data cache 123 and central processing unit core 110 to speed use.

Level two combined cache 130 supplies data of a first data stream to streaming engine 125 via bus 146. Bus 146 is a 512-bit bus in this example embodiment. Streaming engine 125 supplies data of this first data stream to functional units of vector datapath side B 116 via bus 147. Bus 147 is a 512-bit bus in this example embodiment. Level two combined cache 130 supplies data of a second data stream to streaming engine 125 via bus 148. Bus 148 is a 512-bit bus in this example embodiment. Streaming engine 125 supplies data of this second data stream to functional units of vector datapath side B 116 via bus 149. Bus 149 is a 512-bit bus in this example embodiment. Busses 146, 147, 148 and 149 are illustrated as unidirectional from level two combined cache 130 to streaming engine 125 and to vector datapath side B 116 in accordance with this example embodiment.

Streaming engine data requests are directly fetched from level two combined cache 130 upon a cache hit (if the requested data is stored in level two combined cache 130). Upon a cache miss (the specified data is not stored in level two combined cache 130), this data is sought from another level of cache (not illustrated) or from main memory (not illustrated). In some embodiments, level one data cache 123 may cache data not stored in level two combined cache 130. If such operation is supported, then upon a streaming engine data request that is a miss in level two combined cache 130, level two combined cache 130 may snoop level one data cache 123 for the streaming engine requested data. If level one data cache 123 stores this data, its snoop response would include the data, which is then supplied to service the streaming engine request. If level one data cache 123 does not store this data, its snoop response would indicate this and level two combined cache 130 would then service this streaming engine request from another level of cache (not illustrated) or from main memory (not illustrated).

In one embodiment, both level one data cache 123 and level two combined cache 130 may be configured as selected amounts of cache or directly addressable memory in accordance with the aforementioned U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
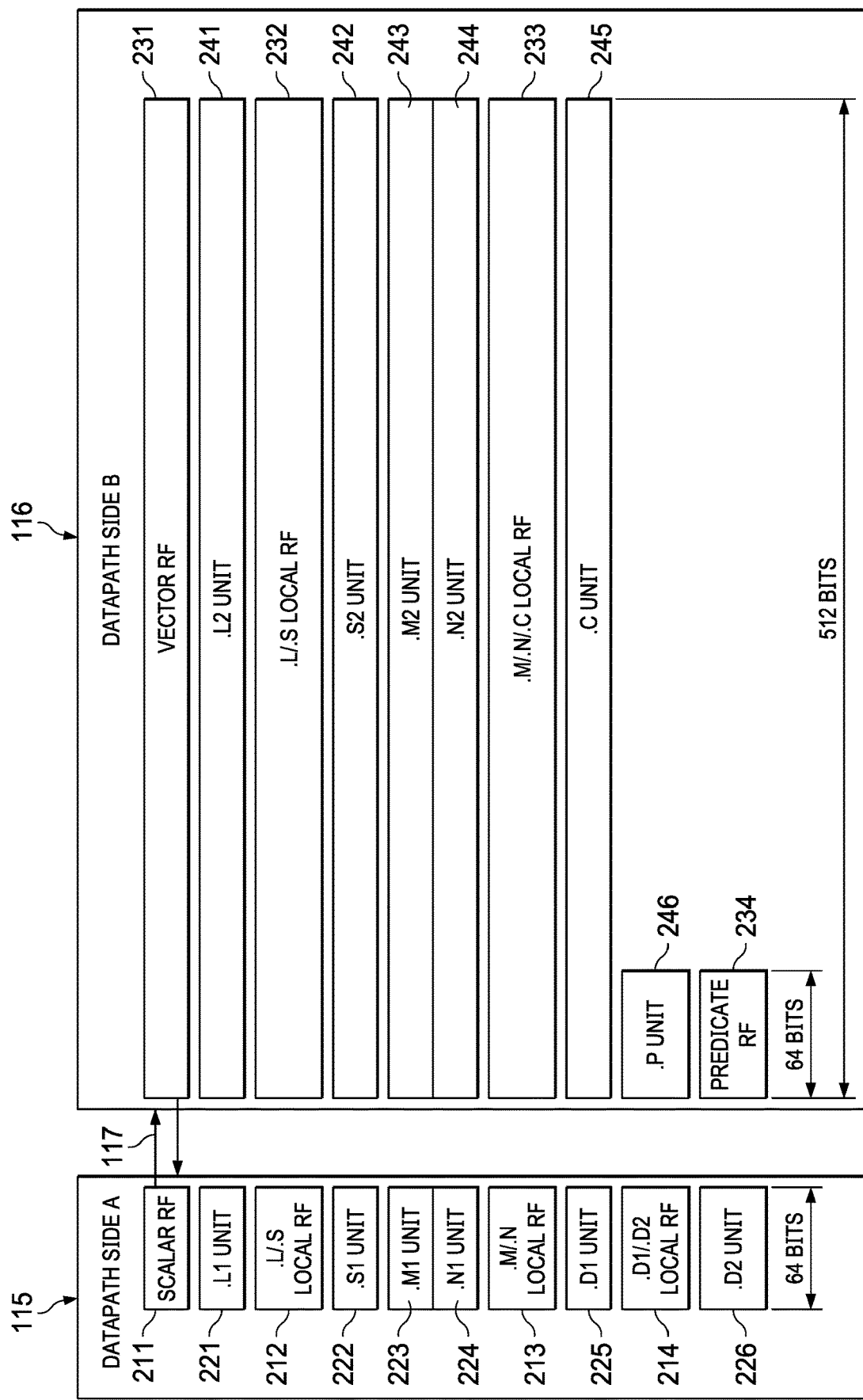
FIG. 2 illustrates the registers and functional units in the dual scalar/vector datapath processor illustrated in FIG. 1.

FIG. 2 illustrates further details of functional units and register files within scalar datapath side A 115 and vector datapath side B 116 in accordance with one example embodiment. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global vector register file 231, L2/S2 local register file 232, M2/N2/C local register file 233 and predicate register file 234. Vector datapath side B 116 includes L2 unit 241, S2 unit 242, M2 unit 243, N2 unit 244, C unit 245 and P unit 246. These functional units may be configured to read from or write to certain register files, as will be detailed below.

L1 unit 221 may accept two 64-bit operands and produce one 64-bit result. The two operands are each recalled from an instruction specified register in either global scalar register file 211 or L1/S1 local register file 212. L1 unit 221 may perform the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result produced by L1 unit 221 may be written into an instruction specified register of global scalar register file 211, L1/S1 local register file 212, M1/N1 local register file 213, or D1/D2 local register file 214.

S1 unit 222 may accept two 64-bit operands and produce one 64-bit result. The two operands are each recalled from an instruction specified register in either global scalar register file 211 or L1/S1 local register file 212. In one embodiment, S1 unit 222 may perform the same type of operations as L1 unit 221. In other embodiments, there may be slight variations between the data processing operations supported by L1 unit 221 and S1 unit 222. The result produced by S1 unit 222 may be written into an instruction specified register of global scalar register file 211, L1/S1 local register file 212, M1/N1 local register file 213, or D1/D2 local register file 214.

M1 unit 223 may accept two 64-bit operands and produce one 64-bit result. The two operands are each recalled from an instruction specified register in either global scalar register file 211 or M1/N1 local register file 213. M1 unit 223 may perform the following instruction selected operations: 8-bit multiply operations; complex dot product operations; 32-bit bit count operations; complex conjugate multiply operations; and bit-wise Logical Operations, moves, adds, and subtracts. The result produced by M1 unit 223 may be written into an instruction specified register of global scalar register file 211, L1/S1 local register file 212, M1/N1 local register file 213, or D1/D2 local register file 214.

N1 unit 224 may accept two 64-bit operands and produce one 64-bit result. The two operands are each recalled from an instruction specified register in either global scalar register file 211 or M1/N1 local register file 213. N1 unit 224 may perform the same type operations as M1 unit 223. There may be certain double operations (called dual issued instructions) that employ both the M1 unit 223 and the N1 unit 224 together. The result produced by N1 unit 224 may be written into an instruction specified register of global scalar register file 211, L1/S1 local register file 212, M1/N1 local register file 213, or D1/D2 local register file 214.

D1 unit 225 and D2 unit 226 may each accept two 64-bit operands and each produce one 64-bit result. D1 unit 225 and D2 unit 226 may perform address calculations and corresponding load and store operations. D1 unit 225 is used for scalar loads and stores of 64 bits. D2 unit 226 is used for vector loads and stores of 512 bits. D1 unit 225 and D2 unit 226 also may perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211, or D1/D2 local register file 214. The calculated result by D1 unit 225 and/or D2 unit 226 may be written into an instruction specified register of global scalar register file 211, L1/S1 local register file 212, M1/N1 local register file 213, or D1/D2 local register file 214.

L2 unit 241 may accept two 512-bit operands and produce one 512-bit result. Each of up to two operands are each recalled from an instruction specified register in either global vector register file 231, L2/S2 local register file 232 or predicate register file 234. L2 unit 241 may perform instruction similar to L1 unit 221 except on wider 512-bit data. The result produced by L2 unit 241 may be written into an instruction specified register of global vector register file 231, L2/S2 local register file 232, M2/N2/C local register file 233, or predicate register file 234.

S2 unit 242 may accept two 512-bit operands and produce one 512-bit result. Each of up to two operands are each recalled from an instruction specified register in either global vector register file 231, L2/S2 local register file 232 or predicate register file 234. S2 unit 242 may perform instructions similar to S1 unit 222 except on wider 512-bit data. The result produced by S2 unit 242 may be written into an instruction specified register of global vector register file 231, L2/S2 local register file 232, M2/N2/C local register file 233, or predicate register file 234.

M2 unit 243 may accept two 512-bit operands and produce one 512-bit result. The two operands are each recalled from an instruction specified register in either global vector register file 231 or M2/N2/C local register file 233. M2 unit 243 may perform instructions similar to M1 unit 223 except on wider 512-bit data. The result produced by M2 unit 243 may be written into an instruction specified register of global vector register file 231, L2/S2 local register file 232, or M2/N2/C local register file 233.

N2 unit 244 may accept two 512-bit operands and produce one 512-bit result. The two operands are each recalled from an instruction specified register in either global vector register file 231 or M2/N2/C local register file 233. N2 unit 244 may perform the same type operations as M2 unit 243. There may be certain double operations (called dual issued instructions) that employ both M2 unit 243 and the N2 unit 244 together. The result produced by N2 unit 244 may be written into an instruction specified register of global vector register file 231, L2/S2 local register file 232, or M2/N2/C local register file 233.

C unit 245 may accepts two 512-bit operands and produce one 512-bit result. The two operands are each recalled from an instruction specified register in either global vector register file 231 or M2/N2/C local register file 233. C unit 245 may perform: "Rake" and "Search" instructions; up to 512 2-bit PN*8-bit multiplies; I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. In one embodiment, C unit 245 includes 4 vector control registers (CUCR0 to CUCR3) used to control certain operations of C unit 245 instructions. Control registers CUCR0 to CUCR3 are used as operands in certain C unit 245 operations. For example, control registers CUCR0 to CUCR3 may be used in control of a general permutation instruction (VPERM) or as masks for SIMD multiple DOT product operations (DOTPM) and SIMD multiple Sum-of-Absolute-Difference (SAD) operations. Control register CUCR0 may be used to store polynomials for Galois Field Multiply operations (GFMPY). Control register CUCR1 may be used to store a Galois field polynomial generator function.

P unit 246 may perform basic logic operations on registers of local predicate register file 234. P unit 246 has direct access to read from and write to predicate register file 234. The operations performed by P unit 246 may include AND, ANDN, OR, XOR, NOR, BITR, NEG, SET, BITCNT, RMBD, BIT Decimate and Expand. One use of P unit 246 can include manipulation of an SIMD vector comparison result for use in control of a further SIMD vector operation.

Figure 3:
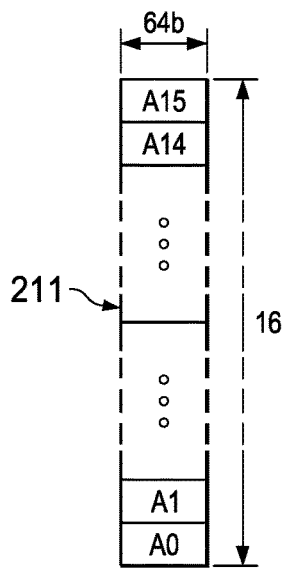
FIG. 3 illustrates a global scalar register file.

FIG. 3 illustrates an example embodiment of global scalar register file 211. In the illustrated embodiment, there are 16 independent 64-bit wide scalar registers designated A0 to A15. Each register of global scalar register file 211 can be read from or written to as 64-bits of scalar data. All scalar datapath side A 115 functional units (L1 unit 221, S1 unit 222, M1 unit 223, N1 unit 224, D1 unit 225, and D2 unit 226) can read or write to global scalar register file 211. Global scalar register file 211 may be read as 32-bits or as 64-bits and may only be written to as 64-bits. The instruction executing determines the read data size. Vector datapath side B 116 functional units (L2 unit 241, S2 unit 242, M2 unit 243, N2 unit 244, C unit 245, and P unit 246) can read from global scalar register file 211 via crosspath 117 under restrictions that will be detailed below.

Figure 4:
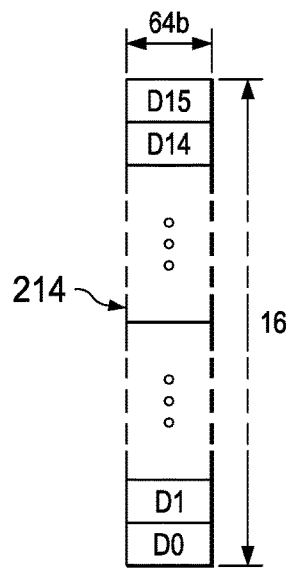
FIG. 4 illustrates a local scalar register file shared by arithmetic functional units.

FIG. 4 illustrates an example embodiment of D1/D2 local register file 214. In the illustrated embodiment, there are 16 independent 64-bit wide scalar registers designated D0 to D16. Each register of D1/D2 local register file 214 can be read from or written to as 64-bits of scalar data. All scalar datapath side A 115 functional units (L1 unit 221, S1 unit 222, M1 unit 223, N1 unit 224, D1 unit 225, and D2 unit 226) can write to D1/D2 local register file 214. Only D1 unit 225 and D2 unit 226 can read from D1/D2 local register file 214. Data stored in D1/D2 local register file 214 may include base addresses and offset addresses used in address calculations.

Figure 5:
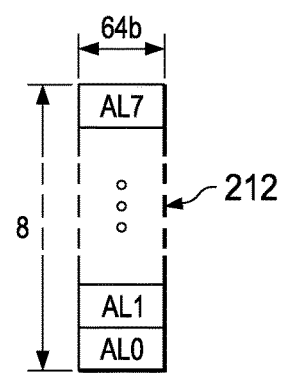
FIG. 5 illustrates a local scalar register file shared by multiply functional units.

FIG. 5 illustrates an example embodiment of L1/S1 local register file 212. The embodiment illustrated in FIG. 5 has 8 independent 64-bit wide scalar registers designated AL0 to AL7. Under certain instruction coding formats (see FIG. 13), L1/S1 local register file 212 can include up to 16 registers. The embodiment of FIG. 5 implements only 8 registers to reduce circuit size and complexity. Each register of L1/S1 local register file 212 can be read from or written to as 64-bits of scalar data. All scalar datapath side A 115 functional units (L1 unit 221, S1 unit 222, M1 unit 223, N1 unit 224, D1 unit 225, and D2 unit 226) can write to L1/S1 local register file 212. Only L1 unit 221 and S1 unit 222 can read from L1/S1 local register file 212.

Figure 6:
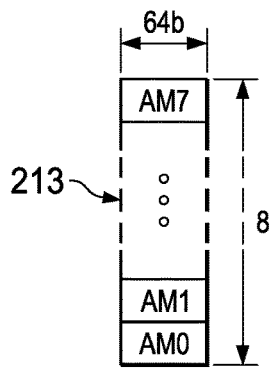
FIG. 6 illustrates a local scalar register file shared by load/store units.

FIG. 6 illustrates an example embodiment of M1/N1 local register file 213. The embodiment illustrated in FIG. 6 has 8 independent 64-bit wide scalar registers designated AM0 to AM7. Under certain instruction coding formats (see FIG. 13), M1/N1 local register file 213 can include up to 16 registers. The embodiment of FIG. 6 implements only 8 registers to reduce circuit size and complexity. Each register of M1/N1 local register file 213 can be read from or written to as 64-bits of scalar data. All scalar datapath side A 115 functional units (L1 unit 221, S1 unit 222, M1 unit 223, N1 unit 224, D1 unit 225, and D2 unit 226) can write to M1/N1 local register file 213. Only M1 unit 223 and N1 unit 224 can read from M1/N1 local register file 213.

Figure 7:
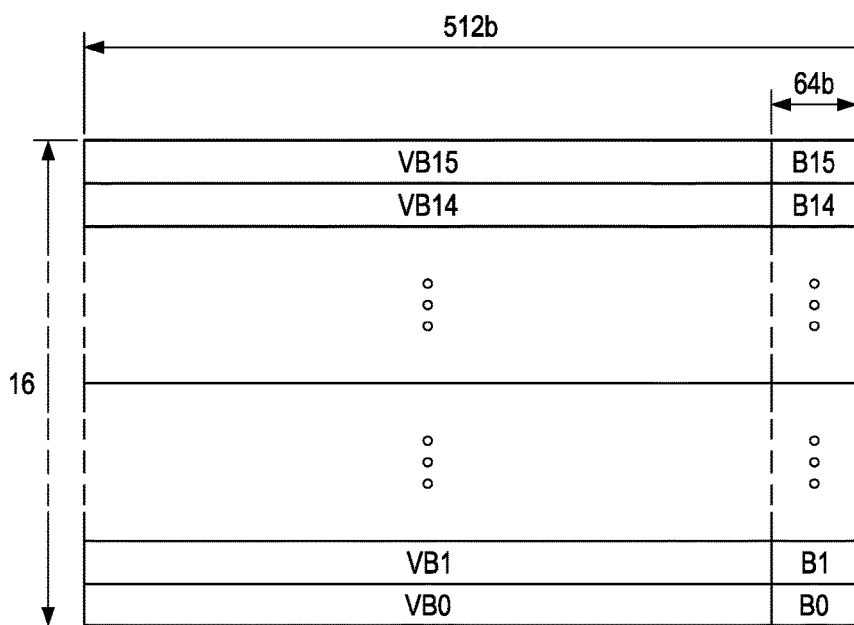
FIG. 7 illustrates a global vector register file.

FIG. 7 illustrates an example embodiment of global vector register file 231. In the illustrated embodiment, there are 16 independent 512-bit wide vector registers. Each register of global vector register file 231 can be read from or written to as 64-bits of scalar data designated B0 to B15. Each register of global vector register file 231 can be read from or written to as 512-bits of vector data designated VB0 to VB15. The instruction type determines the data size. All vector datapath side B 116 functional units (L2 unit 241, S2 unit 242, M2 unit 243, N2 unit 244, C unit 245, and P unit 246) can read or write to global vector register file 231. Scalar datapath side A 115 functional units (L1 unit 221, S1 unit 222, M1 unit 223, N1 unit 224, D1 unit 225, and D2 unit 226) can read from global vector register file 231 via crosspath 117 under restrictions that will be detailed below.

Figure 8:
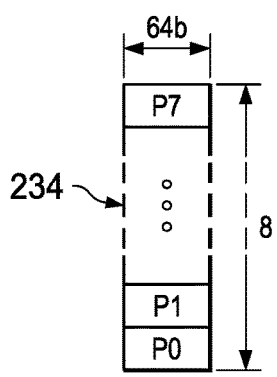
FIG. 8 illustrates a predicate register file.

FIG. 8 illustrates an example embodiment of P local register file 234. In the illustrated embodiment, there are 8 independent 64-bit wide registers designated P0 to P7. Each register of P local register file 234 can be read from or written to as 64-bits of scalar data. Vector datapath side B 116 functional units L2 unit 241, S2 unit 242, C unit 244, and P unit 246 can write to P local register file 234. Only L2 unit 241, S2 unit 242, and P unit 246 can read from P local register file 234. P local register file 234 may be used for: writing one bit SIMD vector comparison results from L2 unit 241, S2 unit 242, or C unit 245; manipulation of SIMD vector comparison results by P unit 246; and use of the manipulated results in control of a further SIMD vector operation.

Figure 9:
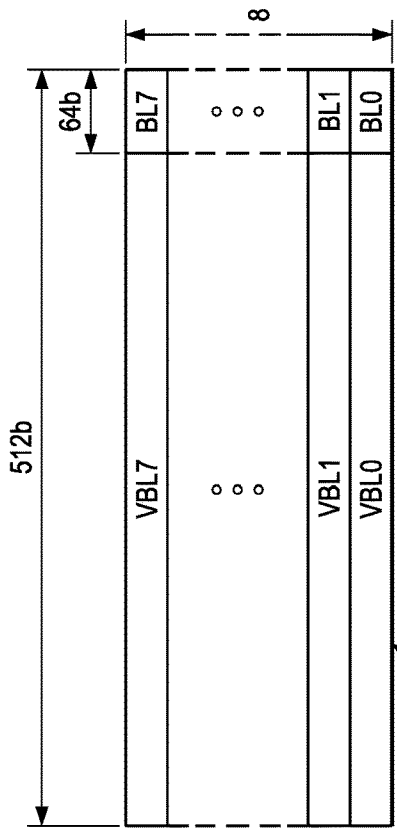
FIG. 9 illustrates a local vector register file shared by arithmetic functional units.

FIG. 9 illustrates an example embodiment of L2/S2 local register file 232. The embodiment illustrated in FIG. 9 has 8 independent 512-bit wide vector registers. Under certain instruction coding formats (see FIG. 13), L2/S2 local register file 232 can include up to 16 registers. The embodiment of FIG. 9 implements only 8 registers to reduce circuit size and complexity. Each register of L2/S2 local vector register file 232 can be read from or written to as 64-bits of scalar data designated BL0 to BL7. Each register of L2/S2 local vector register file 232 can be read from or written to as 512-bits of vector data designated VBL0 to VBL7. The instruction type determines the data size. All vector datapath side B 116 functional units (L2 unit 241, S2 unit 242, M2 unit 243, N2 unit 244, C unit 245, and P unit 246) can write to L2/S2 local register file 232. Only L2 unit 241 and S2 unit 242 can read from L2/S2 local vector register file 232.

Figure 10:
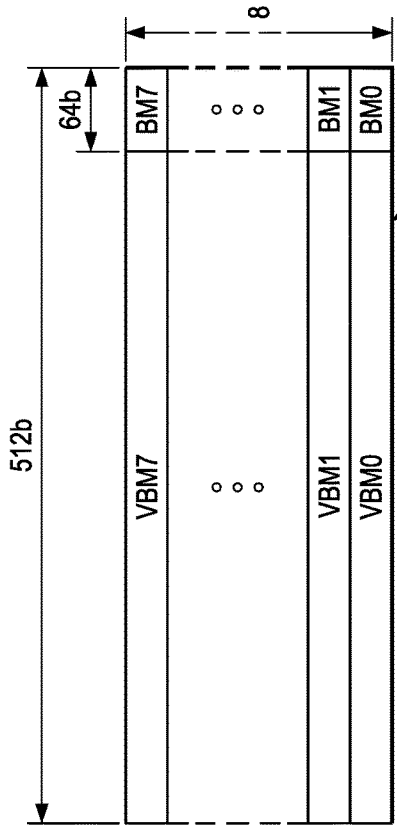
FIG. 10 illustrates a local vector register file shared by multiply and correlation functional units.

FIG. 10 illustrates an example embodiment of M2/N2/C local register file 233. The embodiment illustrated in FIG. 10 has 8 independent 512-bit wide vector registers. Under certain instruction coding formats (see FIG. 13), M2/N2/C local register file 233 can include up to 16 registers. The embodiment of FIG. 10 implements only 8 registers to reduce circuit size and complexity. Each register of M2/N2/C local vector register file 233 can be read from or written to as 64-bits of scalar data designated BM0 to BM7. Each register of M2/N2/C local vector register file 233 can be read from or written to as 512-bits of vector data designated VBM0 to VBM7. All vector datapath side B 116 functional units (L2 unit 241, S2 unit 242, M2 unit 243, N2 unit 244, C unit 245, and P unit 246) can write to M2/N2/C local vector register file 233. Only M2 unit 233, N2 unit 244 and C unit 245 can read from M2/N2/C local vector register file 233.

Thus, in accordance with certain disclosed embodiments of this disclosure, global register files may be accessible by all functional units of a side (e.g., scalar and vector) and local register files may be accessible by only some of the functional units of a side. Some additional embodiments in accordance with this disclosure could be practiced employing only one type of register file corresponding to the disclosed global register files.

Crosspath 117 permits limited exchange of data between scalar datapath side A 115 and vector datapath side B 116. During each operational cycle one 64-bit data word can be recalled from global scalar register file 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225, and D2 unit 226) may read a 64-bit operand from global vector register file 231. This 64-bit operand is the least significant bits of the 512-bit data in the accessed register of global vector register file 231. Scalar datapath side A 115 functional units may employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245, and P unit 246) may read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Vector datapath side B 116 functional units may employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain circumstances. In the embodiment of FIG. 1, streaming engine 125 controls two data streams. A stream includes a sequence of elements of a particular type. Programs that operate on streams read the data sequentially, operating on each element in turn. Stream data may have the following basic properties: a well-defined beginning and ending time; fixed element size and type throughout the stream; and a fixed sequence of elements. Thus programs cannot seek randomly within the stream. Further, stream data is read-only while active. Thus, programs cannot write to a stream while simultaneously reading from it. Once a stream is opened, streaming engine 125: calculates the address; fetches the defined data type from level two unified cache 130 (which may require cache service from a higher level memory, i.e., in the event of a cache miss in level two unified cache 130); performs data type manipulation (e.g., such as zero extension, sign extension, and/or data element sorting/swapping such as matrix transposition); and delivers the data directly to the programmed data register file within CPU 110. Streaming engine 125 is thus useful for real-time digital filtering operations on well-behaved data. Streaming engine 125 frees these memory fetch tasks from the corresponding CPU 110, thereby enabling the CPU 110 to perform other processing functions.

Streaming engine 125 provides several benefits. For example, streaming engine 125 permits multi-dimensional memory accesses, increases the available bandwidth to functional units of CPU 110, reduces the number of cache miss stalls since the stream buffer bypasses level one data cache 123, reduces the number of scalar operations required to maintain a loop, and manages address pointers. Streaming engine 125 can also handle address generation, which frees up address generation instruction slots and D1 unit 225 and D2 unit 226 for other computations.

CPU 110 operates on an instruction pipeline. Instructions are fetched in instruction packets of a fixed length as further described below. All instructions have the same number of pipeline phases for fetch and decode, but can have a varying number of execute phases.

Figure 11:
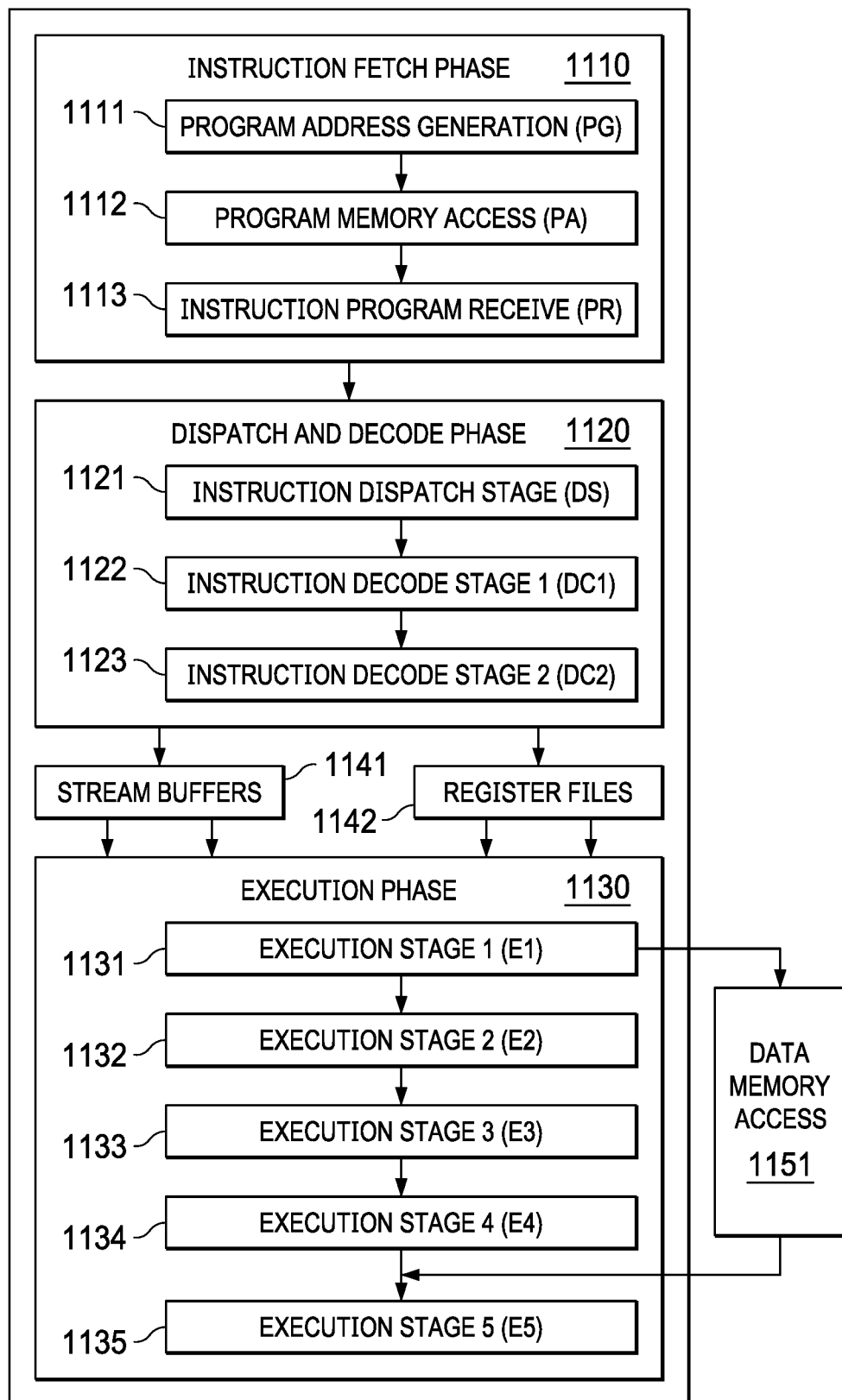
FIG. 11 illustrates pipeline phases of a central processing unit according to an example embodiment.

FIG. 11 illustrates an example embodiment of an instruction pipeline having the following pipeline phases: program fetch phase 1110, dispatch and decode phases 1120, and execution phase 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA), and program receive stage 1113 (PR). During program address generation stage 1111 (PG), a program address is generated in the CPU and a read request is sent to a memory controller for the level one instruction cache L1I. During the program access stage 1112 (PA), the level one instruction cache L1I processes the request, accesses the data in its memory, and sends a fetch packet to the CPU boundary. During the program receive stage 1113 (PR), the CPU registers the fetch packet.

Figure 12:
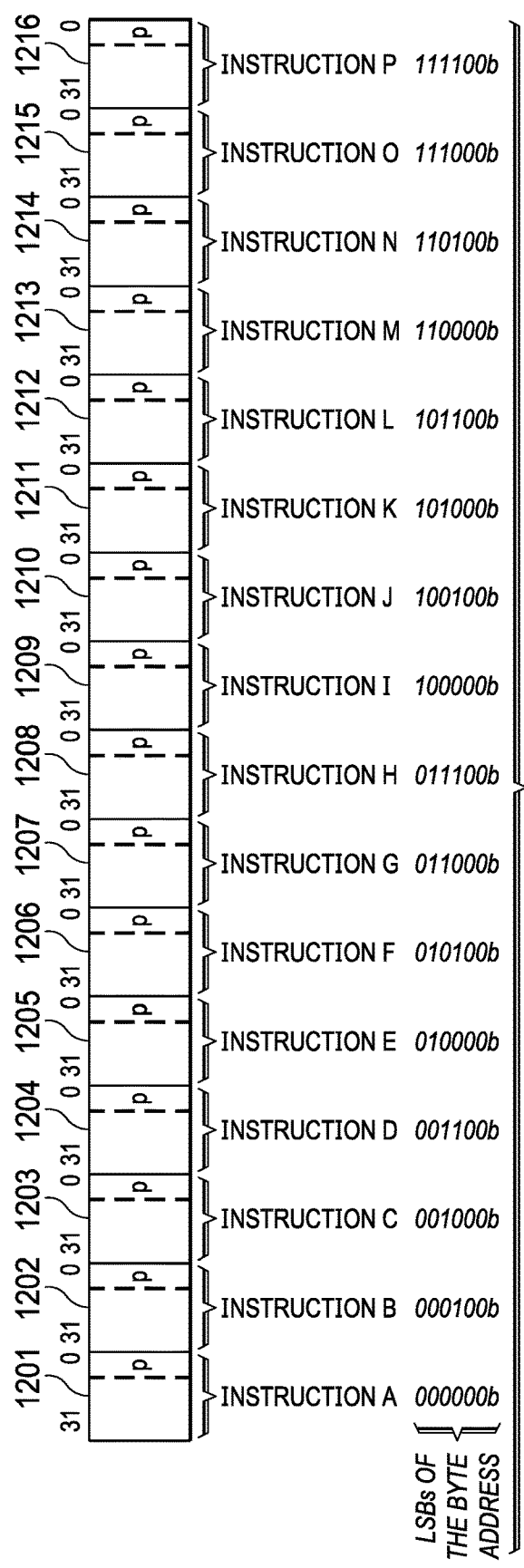
FIG. 12 illustrates sixteen instructions of a single fetch packet.

In an example embodiment, instructions are fetched as sixteen 32-bit wide slots, constituting a fetch packet, at a time. FIG. 12 illustrates one such embodiment, where a single fetch packet includes sixteen instructions 1201 to 1216. Fetch packets are aligned on 512-bit (16-word) boundaries. The fetch packet, in one embodiment, employs a fixed 32-bit instruction length. Fixed length instructions are advantageous for several reasons. Fixed length instructions enable easy decoder alignment. A properly aligned instruction fetch can load plural instructions into parallel instruction decoders. Such a properly aligned instruction fetch can be achieved by predetermined instruction alignment when stored in memory (fetch packets aligned on 512-bit boundaries) coupled with a fixed instruction packet fetch. An aligned instruction fetch also permits operation of parallel decoders on instruction-sized fetched bits. Variable length instructions may require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit can be configured as bit 0 of the 32-bit wide slot. The p bit of an instruction determines whether the instruction executes in parallel with a next instruction. Instructions are scanned from lower to higher addresses. If the p bit of an instruction is 1, then the next following instruction (higher memory address) is executed in parallel with (in the same cycle as) that instruction. If the p bit of an instruction is 0, then the next following instruction is executed in the cycle after the instruction.

CPU 110 and level one instruction cache L1I 121 pipelines are de-coupled from each other. Fetch packet returns from level one instruction cache L1I can take different number of clock cycles, depending on external circumstances such as whether there is a hit in level one instruction cache 121 or a hit in level two combined cache 130. Therefore program access stage 1112 (PA) can take several clock cycles instead of 1 clock cycle as in the other stages.

The instructions executing in parallel constitute an execute packet. In one embodiment, an execute packet can contain up to sixteen instructions (slots). No two instructions in an execute packet may use the same functional unit. A slot can be one of five types: 1) a self-contained instruction executed on one of the functional units of CPU 110 (L1 unit 221, S1 unit 222, M1 unit 223, N1 unit 224, D1 unit 225, D2 unit 226, L2 unit 241, S2 unit 242, M2 unit 243, N2 unit 244, C unit 245, and P unit 246); 2) a unitless instruction such as a NOP (no operation) instruction or multiple NOP instructions; 3) a branch instruction; 4) a constant field extension; and 5) a conditional code extension. Some of these slot types will be further explained below.

Dispatch and decode phases 1120 include instruction dispatch to appropriate execution unit stage 1121 (DS), instruction pre-decode stage 1122 (DC1), and instruction decode, operand reads stage 1123 (DC2). During instruction dispatch to appropriate execution unit stage 1121 (DS) the fetch packets are split into execute packets and assigned to the appropriate functional units. During the instruction pre-decode stage 1122 (DC1), the source registers, destination registers, and associated paths are decoded for the execution of the instructions in the functional units. During the instruction decode, operand reads stage 1123 (DC2), more detailed unit decodes are done, as well as reading operands from the register files.

Execution phase 1130 includes execution stages 1131 to 1135 (E1 to E5). Different types of instructions may require different numbers of these stages to complete their execution. These stages of the pipeline play an important role in understanding the device state at CPU cycle boundaries.

During execute 1 stage 1131 (E1), the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, a branch fetch packet in PG phase is affected.

As illustrated in FIG. 11, load and store instructions access memory, shown here schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2), load instructions send the address to memory. Store instructions send the address and data to memory. Single-cycle instructions that saturate results set a bit (SAT) in the control status register (CSR) if saturation occurs. For 2-cycle instructions, results are written to a destination register file.

During execute 3 stage 1133 (E3), data memory accesses are performed. Any multiply instructions that saturate results set the SAT bit in the control status register (CSR) if saturation occurs. For 3-cycle instructions, results are written to a destination register file During execute 4 stage 1134 (E4), load instructions bring data to the CPU boundary. For 4-cycle instructions, results are written to a destination register file.

During execute 5 stage 1135 (E5), load instructions write data into a register. This is illustrated schematically in FIG. 11 with input from memory 1151 to execute 5 stage 1135.

Figure 13:
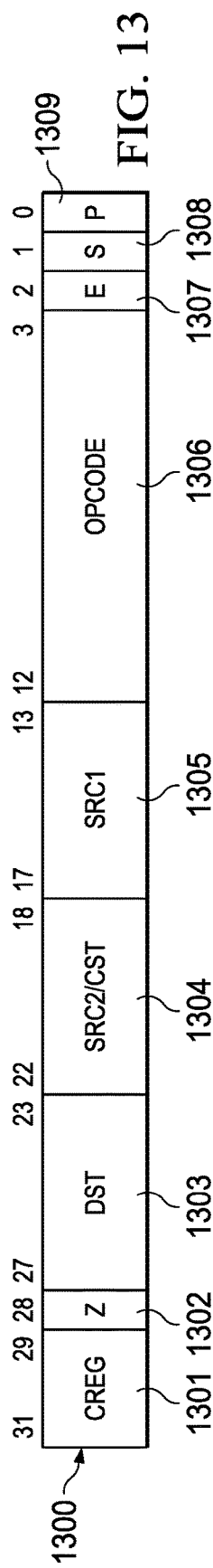
FIG. 13 illustrates an instruction coding example in accordance with one embodiment.

FIG. 13 illustrates an instruction coding format 1300 of functional unit instructions in accordance with an example embodiment. Those skilled in the art would realize that other instruction codings are feasible and within the scope of this disclosure. In the illustrated embodiment, each instruction includes 32 bits and controls the operation of one of the individually controllable functional units (L1 unit 221, S1 unit 222, M1 unit 223, N1 unit 224, D1 unit 225, D2 unit 226, L2 unit 241, S2 unit 242, M2 unit 243, N2 unit 244, C unit 245, and P unit 246). The bit fields of instruction coding 1300 are defined as follows.

The creg field 1301 (bits 29 to 31) and the z bit 1302 (bit 28) are fields used in conditional instructions. These bits are used for conditional instructions to identify a predicate (also referred to as "conditional") register and a condition. The z bit 1302 (bit 28) indicates whether the condition is based upon zero or not zero in the predicate register. If z=1, the test is for equality with zero. If z=0, the test is for nonzero. For unconditional instructions, the creg field 1301 and z bit 1302 are set to all 0s to allow unconditional instruction execution. The creg field 1301 and the z field 1302 are encoded in the instruction as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |

TABLE 1-continued

| Conditional Register | creg | | | z |
|---|---|---|---|---|
| | 31 | 30 | 29 | 28 |
| A4 | 1 | 0 | 1 | z |
| A5 | 1 | 1 | 0 | z |
| Reserved | 1 | 1 | x | x |

Execution of a conditional instruction is conditional upon the value stored in the specified conditional data register. In this illustrated example, the conditional register is a data register in the global scalar register file 211. The "z" in the z bit column refers to the zero/not zero comparison selection noted above, and "x" is a do not care state. In this example, the use of three bits for the creg field 1301 in this coding allows for specifying only a subset (A0-A5) of the 16 global registers of global scalar register file 211 as predicate registers. This selection was made to preserve bits in the instruction coding and reduce opcode space.

The dst field 1303 (bits 23 to 27) specifies a register in a corresponding register file as the destination of the instruction results (e.g., where the results are to be written).

The src2/cst field 1304 (bits 18 to 22) can be interpreted in different ways depending on the instruction opcode field (bits 4 to 12 for all instructions and additionally bits 28 to 31 for unconditional instructions). The src2/cst field 1304 indicates a second source operand, either from a register of a corresponding register file or as a constant depending on the instruction opcode field. Depending on the instruction type, when the second source operand is a constant, this may be treated as an unsigned integer and zero extended to a specified data length or may be treated as a signed integer and sign extended to the specified data length.

The src1 field 1305 (bits 13 to 17) specifies a register in a corresponding register file as a first source operand.

The opcode field 1306 (bits 4 to 12) for all instructions (and additionally bits 28 to 31 for unconditional instructions) specifies the type of instruction and designates appropriate instruction options. This includes designation of the functional unit used and the operation performed. Additional details regarding such instruction options are detailed below.

The e bit 1307 (bit 2) is used for immediate constant instructions where the constant may be extended. If e=1, then the immediate constant is extended in a manner detailed below. If e=0, then the immediate constant is not extended. In the latter case, the immediate constant is specified by the src2/cst field 1304 (bits 18 to 22). The e bit 1307 may be used for only some types of instructions. Accordingly, with proper coding, the e bit 1307 may be omitted from instructions which do not need it, and this bit can instead be used as an additional opcode bit.

The s bit 1308 (bit 1) designates scalar datapath side A 115 or vector datapath side B 116. If s=0, then scalar datapath side A 115 is selected, and the available functional units (L1 unit 221, S1 unit 222, M1 unit 223, N1 unit 224, D1 unit 225, and D2 unit 226) and register files (global scalar register file 211, L1/S1 local register file 212, M1/N1 local register file 213, and D1/D2 local register file 214) will be those corresponding to scalar datapath side A 115 as illustrated in FIG. 2. Similarly, s=1 selects vector datapath side B 116, and the available functional units (L2 unit 241, S2 unit 242, M2 unit 243, N2 unit 244, C unit 245, and P unit 246) and register files (global vector register file 231, L2/S2 local register file 232, M2/N2/C local register file 233, and predicate local register file 234) will be those corresponding to vector datapath side B 116 as illustrated in FIG. 2.

The p bit 1308 (bit 0) is used to determine whether the instruction executes in parallel with the following instruction. The p-bits are scanned from lower to higher addresses. If p=1 for the current instruction, then the next instruction executes in parallel with the current instruction. If p=0 for the current instruction, then the next instruction executes in the cycle after the current instruction. All instructions executing in parallel constitute an execute packet. In one example embodiment, an execute packet can contain up to twelve instructions for parallel execution, with each instruction in an execute packet assigned to a different functional unit.

Figure 14:
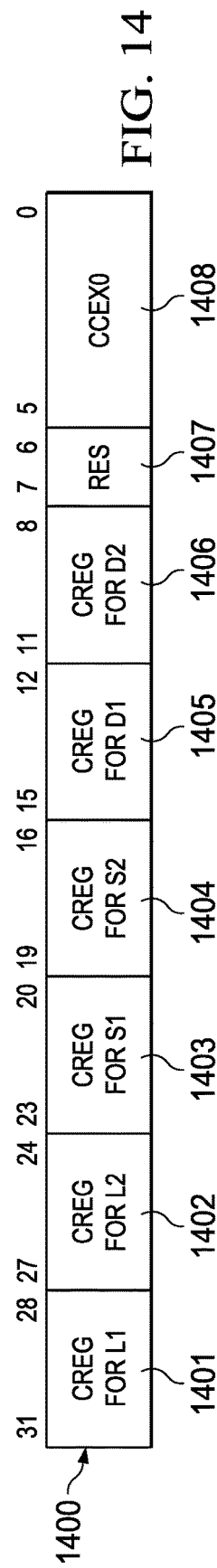
FIG. 14 illustrates the bit coding of a condition code extension slot 0.

In one example embodiment of processor 100, there are two different condition code extension slots (slot 0 and slot 1). The condition code extension slots may be 32-bit in this example embodiment, as with the coding format 1300 described in FIG. 13. Each execute packet can contain one each of these 32-bit condition code extension slots, which contains the 4-bit creg/z fields (e.g., similar to bits 28 to 31 of coding 1300) for the instructions in the same execute packet. FIG. 14 illustrates an example coding for condition code extension slot 0 and FIG. 15 illustrates an example coding for condition code extension slot 1.

FIG. 14 illustrates an example coding 1400 for condition code extension slot 0. Field 1401 (bits 28 to 31) specify 4 creg/z bits assigned to the L1 unit 221 instruction in the same execute packet. Field 1402 (bits 27 to 24) specify 4 creg/z bits assigned to the L2 unit 241 instruction in the same execute packet. Field 1403 (bits 19 to 23) specify 4 creg/z bits assigned to the S1 unit 222 instruction in the same execute packet. Field 1404 (bits 16 to 19) specify 4 creg/z bits assigned to the S2 unit 242 instruction in the same execute packet. Field 1405 (bits 12 to 15) specify 4 creg/z bits assigned to the D1 unit 225 instruction in the same execute packet. Field 1406 (bits 8 to 11) specify 4 creg/z bits assigned to the D2 unit 226 instruction in the same execute packet. Field 1407 (bits 6 and 7) is unused/reserved. Field 1408 (bits 0 to 5) is coded with a set of unique bits (CCEX0) to identify the condition code extension slot 0. Once this unique ID of condition code extension slot 0 is detected, the corresponding creg/z bits are employed to control conditional execution of any L1 unit 221, L2 unit 241, S1 unit 222, S2 unit 242, D1 unit 225, and D2 unit 226 instructions in the same execution packet. These creg/z bits are interpreted as shown in Table 1. If the corresponding instruction is conditional (e.g., creg/z bits are not all 0) the corresponding bits in the condition code extension slot 0 override the condition code bits (bits 28 to 31 of creg field 1301 and z bit 1302) in the instruction (e.g., coded using coding format 1300). In the illustrated example, no execution packet can have more than one instruction directed to a particular execution unit, and no execute packet of instructions can contain more than one condition code extension slot 0. Thus, the mapping of creg/z bits to functional unit instructions is unambiguous. As discussed above, setting the creg/z bits equal to "0000" makes the instruction unconditional. Thus, a properly coded condition code extension slot 0 can make some corresponding instructions conditional and some unconditional.

Figure 15:
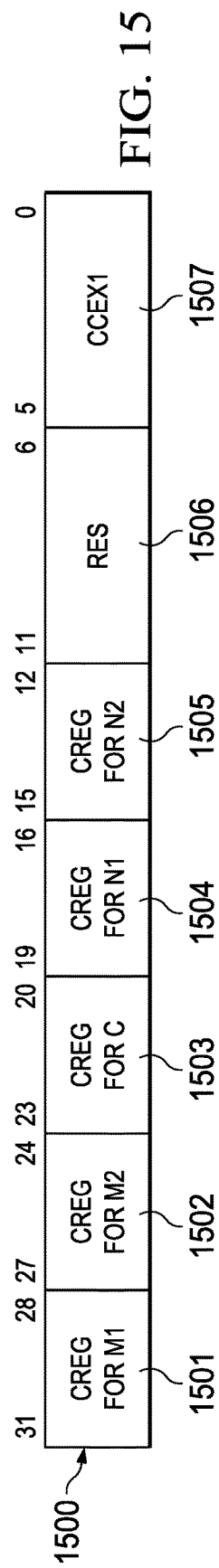
FIG. 15 illustrates the bit coding of a condition code extension slot 1.

FIG. 15 illustrates an example coding 1500 for condition code extension slot 1. Field 1501 (bits 28 to 31) specify 4 creg/z bits assigned to the M1 unit 223 instruction in the same execute packet. Field 1502 (bits 27 to 24) specify 4 creg/z bits assigned to the M2 unit 243 instruction in the same execute packet. Field 1503 (bits 19 to 23) specify 4 creg/z bits assigned to the C unit 245 instruction in the same execute packet. Field 1504 (bits 16 to 19) specify 4 creg/z bits assigned to the N1 unit 224 instruction in the same execute packet. Field 1505 (bits 12 to 15) specify 4 creg/z bits assigned to the N2 unit 244 instruction in the same execute packet. Field 1506 (bits 6 to 11) is unused/reserved. Field 1507 (bits 0 to 5) is coded with a set of unique bits (CCEX1) to identify the condition code extension slot 1. Once this unique ID of condition code extension slot 1 is detected, the corresponding creg/z bits are employed to control conditional execution of any M1 unit 223, M2 unit 243, C unit 245, N1 unit 224 and N2 unit 244 instructions in the same execution packet. These creg/z bits are interpreted as shown in Table 1. If the corresponding instruction is conditional (e.g., creg/z bits are not all 0) the corresponding bits in the condition code extension slot 1 override the condition code bits (bits 28 to 31 of creg field 1301 and z bit 1302) in the instruction (e.g., coded using coding format 1300). In the illustrated example, no execution packet can have more than one instruction directed to a particular execution unit, and no execute packet of instructions can contain more than one condition code extension slot 1. Thus, the mapping of creg/z bits to functional unit instruction is unambiguous. As discussed above, setting the creg/z bits equal to "0000" makes the instruction unconditional. Thus, a properly coded condition code extension slot 1 can make some instructions conditional and some unconditional.

Both condition code extension slot 0 1400 and condition code extension slot 1 may include a p bit to define an execute packet as described above in conjunction with FIG. 13. In one example embodiment, as illustrated in FIGS. 14 and 15, bit 0 of code extension slot 0 1400 and condition code extension slot 1 1500 may provide the p bit. Assuming the p bit for the code extension slots 1400, 1500 is always encoded as 1 (parallel execution), neither code extension slot 1400, 1500 should be the last instruction slot of an execute packet.

In one example embodiment of processor 100, there are two different constant extension slots. Each execute packet can contain one each of these unique 32-bit constant extension slots which contains 27 bits to be concatenated as high order bits with a 5-bit constant field in the instruction coding 1300 to form a 32-bit constant. As noted in the instruction coding 1300 description above, only some instructions define the 5-bit src2/cst field 1304 as a constant rather than a source register identifier. At least some of those instructions may employ a constant extension slot to extend this constant to 32 bits.

Figure 16:
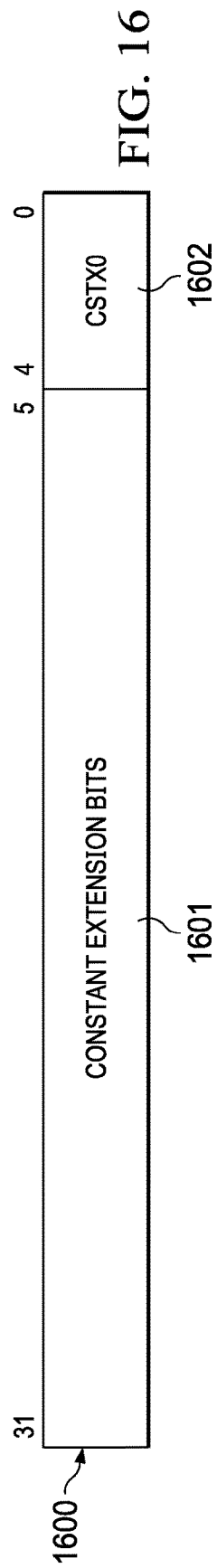
FIG. 16 illustrates the bit coding of a constant extension slot 0.

FIG. 16 illustrates an example coding 1600 of constant extension slot 0. Each execute packet may include one instance of constant extension slot 0 and one instance of constant extension slot 1. FIG. 16 illustrates that constant extension slot 0 1600 includes two fields. Field 1601 (bits 5 to 31) constitute the most significant 27 bits of an extended 32-bit constant with the target instruction scr2/cst field 1304 providing the five least significant bits. Field 1602 (bits 0 to 4) are coded a set of unique bits (CSTX0) to identify the constant extension slot 0. In an example embodiment constant extension slot 0 1600 is used to extend the constant of one of an L1 unit 221 instruction, data in a D1 unit 225 instruction, an S2 unit 242 instruction, an offset in a D2 unit 226 instruction, an M2 unit 243 instruction, an N2 unit 244 instruction, a branch instruction, or a C unit 245 instruction in the same execute packet. Constant extension slot 1 is similar to constant extension slot 0 except that bits 0 to 4 are coded a set of unique bits (CSTX1) to identify the constant extension slot 1. In an example embodiment, constant extension slot 1 is used to extend the constant of one of an L2 unit 241 instruction, data in a D2 unit 226 instruction, an S1 unit 222 instruction, an offset in a D1 unit 225 instruction, an M1 unit 223 instruction, or an N1 unit 224 instruction in the same execute packet.

Constant extension slot 0 and constant extension slot 1 are used as follows. The target instruction must be of the type permitting constant specification. As known in the art this is implemented by replacing one input operand register specification field with the least significant bits of the constant as described above with respect to scr2/cst field 1304. Instruction decoder 113 determines this case, known as an immediate field, from the instruction opcode bits. The target instruction also includes one constant extension bit (e bit 1307) dedicated to signaling whether the specified constant is not extended (e.g., constant extension bit=0) or the constant is extended (e.g., constant extension bit=1). If instruction decoder 113 detects a constant extension slot 0 or a constant extension slot 1, it further checks the other instructions within that execute packet for an instruction corresponding to the detected constant extension slot. A constant extension is made when a corresponding instruction has a constant extension bit (e bit 1307) equal to 1.

Figure 17:
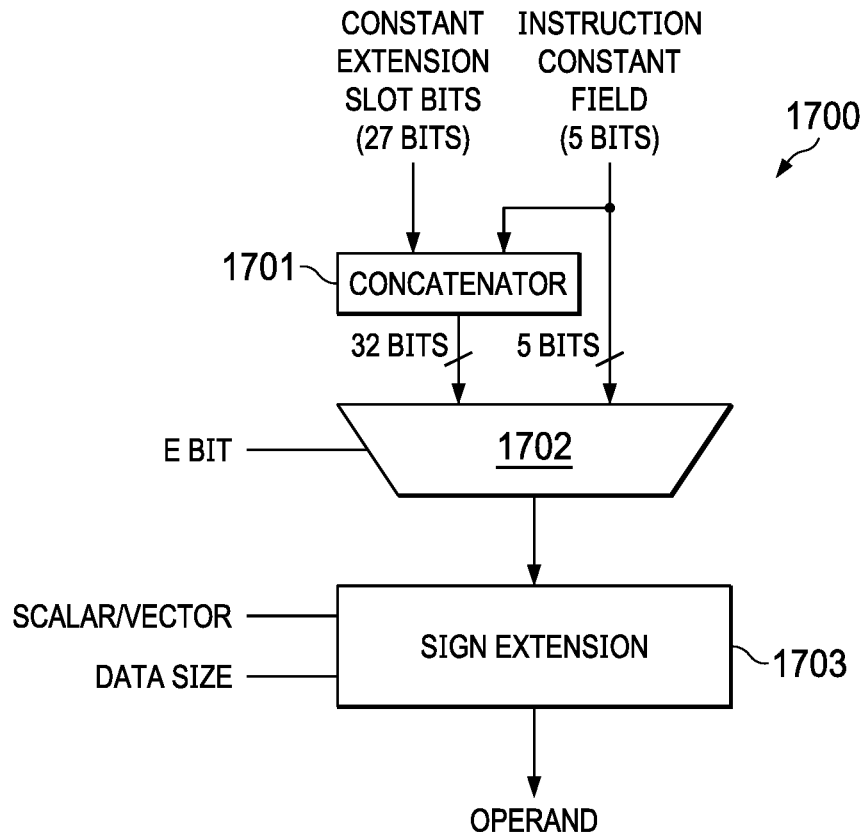
FIG. 17 is a partial block diagram illustrating constant extension.

FIG. 17 is a block diagram 1700 illustrating constant extension logic that may be implemented in processor 100. FIG. 17 assumes that instruction decoder 113 detects a constant extension slot and a corresponding instruction in the same execute packet. Instruction decoder 113 supplies the 27 extension bits from the constant extension slot (bit field 1601) and the 5 constant bits (bit field 1304) from the corresponding instruction to concatenator 1701. Concatenator 1701 forms a single 32-bit word from these two parts. In the illustrated embodiment, the 27 extension bits from the constant extension slot (bit field 1601) are the most significant bits and the 5 constant bits (bit field 1305) are the least significant bits. This combined 32-bit word is supplied to one input of multiplexer 1702. The 5 constant bits from the corresponding instruction field 1305 supply a second input to multiplexer 1702. Selection of multiplexer 1702 is controlled by the status of the constant extension bit. If the constant extension bit (e bit 1307) is 1 (extended), multiplexer 1702 selects the concatenated 32-bit input. If the constant extension bit is 0 (not extended), multiplexer 1702 selects the 5 constant bits from the corresponding instruction field 1305. Multiplexer 1702 supplies this output to an input of sign extension unit 1703.

Sign extension unit 1703 forms the final operand value from the input from multiplexer 1703. Sign extension unit 1703 receives control inputs ScalarNector and Data Size. The ScalarNector input indicates whether the corresponding instruction is a scalar instruction or a vector instruction. The functional units of data path side A 115 (L1 unit 221, S1 unit 222, M1 unit 223, N1 unit 224, D1 unit 225 and D2 unit 226) are, in this embodiment, limited to performing scalar instructions. Any instruction directed to one of these functional units is a scalar instruction. Data path side B functional units L2 unit 241, S2 unit 242, M2 unit 243, N2 unit 244 and C unit 245 may perform scalar instructions or vector instructions. Instruction decoder 113 determines whether the instruction is a scalar instruction or a vector instruction from the opcode bits. P unit 246 may only perform scalar instructions in this embodiment. The Data Size may be 8 bits (byte B), 16 bits (half-word H), 32 bits (word W), 64 bits (double word D), quad word (128 bit) data or half vector (256 bit) data.

Table 2 lists the operation of sign extension unit 1703 for the various options.

TABLE 2

| Instruction Type | Operand Size | Constant Length | Action |
|---|---|---|---|
| Scalar | B/H/W/D | 5 bits | Sign extend to 64 bits |
| Scalar | B/H/W/D | 32 bits | Sign extend to 64 bits |
| Vector | B/H/W/D | 5 bits | Sign extend to operand size and replicate across the whole vector |
| Vector | B/H/W | 32 bits | Replicate 32-bit constant across each 32-bit (W) lane |
| Vector | D | 32 bits | Sign extend to 64 bits and replicate across each 64-bit (D) lane |

Both constant extension slot 0 and constant extension slot 1 may include a p bit to define an execute packet as described above in conjunction with FIG. 13. In one example embodiment, as in the case of the condition code extension slots, bit 0 of constant extension slot 0 and constant extension slot 1 may provide the p bit. Assuming the p bit for constant extension slot 0 and constant extension slot 1 is always encoded as 1 (parallel execution), neither constant extension slot 0 nor constant extension slot 1 should be in the last instruction slot of an execute packet.

In some embodiments, an execute packet can include a constant extension slot 0 or 1 and more than one corresponding instruction marked constant extended (e bit=1). For constant extension slot 0, this would mean more than one of an L1 unit 221 instruction, data in a D1 unit 225 instruction, an S2 unit 242 instruction, an offset in a D2 unit 226 instruction, an M2 unit 243 instruction, or an N2 unit 244 instruction in an execute packet have an e bit of 1. For constant extension slot 1 this would mean more than one of an L2 unit 241 instruction, data in a D2 unit 226 instruction, an S1 unit 222 instruction, an offset in a D1 unit 225 instruction, an M1 unit 223 instruction or an N1 unit 224 instruction in an execute packet have an e bit of 1. In such instances, instruction decoder 113 may, in one embodiment, determine this case an invalid and unsupported operation. In another embodiment, this combination may be supported with extension bits of the constant extension slot applied to each corresponding functional unit instruction marked constant extended.

Special vector predicate instructions use registers in predicate register file 234 to control vector operations. In the current embodiment, all the SIMD vector predicate instructions operate on selected data sizes. The data sizes may include byte (8 bit) data, half word (16 bit) data, word (32 bit) data, double word (64 bit) data, quad word (128 bit) data and half vector (256 bit) data. Each bit of the predicate register controls whether a SIMD operation is performed upon the corresponding byte of data. The operations of P unit 246 permit a variety of compound vector SIMD operations based upon more than one vector comparison. For example, a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

L1 unit 221, S1 unit 222, L2 unit 241, S2 unit 242 and C unit 245 often operate in a single instruction multiple data (SIMD) mode. In this SIMD mode, the same instruction is applied to packed data from the two operands. Each operand holds plural data elements disposed in predetermined slots. SIMD operation is enabled by carry control at the data boundaries. Such carry control enables operations on varying data widths.

Figure 18:
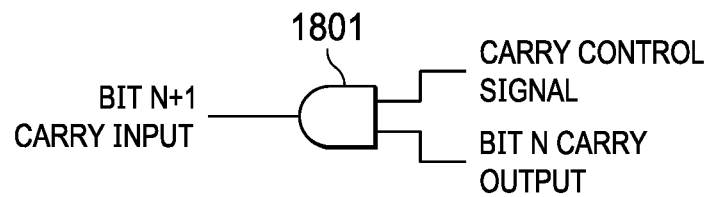
FIG. 18 illustrates a carry control for SIMD operations according an example embodiment.

FIG. 18 illustrates the carry control. AND gate 1801 receives the carry output of bit N within the operand wide arithmetic logic unit (64 bits for scalar datapath side A 115 functional units and 512 bits for vector datapath side B 116 functional units). AND gate 1801 also receives a carry control signal which will be further explained below. The output of AND gate 1801 is supplied to the carry input of bit N+1 of the operand wide arithmetic logic unit. AND gates such as AND gate 1801 are disposed between every pair of bits at a possible data boundary. For example, for 8-bit data, such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 3 below shows example carry control signals for the case of a 512-bit wide operand, such as used by vector datapath side B 116 functional units, which may be divided into sections of 8 bits, 16 bits, 32 bits, 64 bits, 128 bits, or 256 bits. In Table 3 the upper 32 bits control the upper bits (bits 128 to 511) carries and the lower 32 bits control the lower bits (bits 0 to 127) carries. No control of the carry output of the most significant bit is needed, thus only 63 carry control signals are required.

TABLE 3

| Data Size | Carry Control Signals |
|---|---|
| 8 bits (B) | -000 0000 0000 0000 0000 0000 0000 0000 0000 0000 0000 0000 0000 0000 0000 0000 |
| 16 bits (H) | -101 0101 0101 0101 0101 0101 0101 0101 0101 0101 0101 0101 0101 0101 0101 0101 |
| 32 bits (W) | -111 0111 0111 0111 0111 0111 0111 0111 0111 0111 0111 0111 0111 0111 0111 0111 |
| 64 bits (D) | -111 1111 0111 1111 0111 1111 0111 1111 0111 1111 0111 1111 0111 1111 0111 1111 |
| 128 bits | -111 1111 1111 1111 0111 1111 1111 1111 0111 1111 1111 1111 0111 1111 1111 1111 |
| 256 bits | -111 1111 1111 1111 1111 1111 1111 1111 0111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

Processor 100 includes dedicated instructions to perform table look up operations implemented via one of D1 unit 225 or D2 unit 226. The tables for these table look up operations are mapped into level one data cache 123 directly addressable memory. An example of such a table/cache configuration is disclosed in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY. These tables may be loaded by normal memory operations, such as via a direct memory access (DMA) port, by a special purpose LUTINIT instruction (described below), or just a normal store instruction to the memory space containing the tables. In one example embodiment, processor 100 supports up to 4 separate sets of parallel look up tables and, within a set, up to 16 tables can be looked up in parallel with byte, half word or word element sizes. In accordance with this embodiment, at least the portion of level one data cache 123 devoted to directly addressed memory has 16 banks. This permits parallel access to 16 memory locations and supports up to 16 tables per table set.

These look up tables are accessed with independently specified base and index addresses. A look up table base address register (LTBR) specifies the base address for each set of parallel tables. Each look up table instruction contains a set number identifying which base address register to use for that instruction. Based upon the use of a directly addressable portion of the level one data cache 123, each base address should align with the cache line size of the level one data cache 123. In one embodiment, the cache line size may be 128 bytes.

A look up table configuration register for each set of parallel tables sets controls information to the corresponding set of tables. FIG. 19 illustrates the data fields of an example look up table configuration register 1900. Promotion field 1901 (bits 24 and 25) sets the type of promotion upon storage of elements into a vector register. Promotion field 1901 is decoded as shown in Table 4.

TABLE 4

| PROMOTION | Description |
|---|---|
| 00 | No promotion |
| 01 | 2x Promotion |
| 10 | 4x Promotion |
| 11 | 8x Promotion |

A field 1901 coding of 00 designates no promotion. A field 1901 coding of 01 designates a 2x promotion. A field 1901 coding of 10 designates a 4x promotion. A field 1901 coding of 11 designates an 8x promotion. In one example embodiment, the promoted data is limited to data sizes up to a double-word size (64 bits). Thus, in such an embodiment: a 2x promotion is valid for a data element size of byte (promoted from byte (8 bits) to half word (16 bits), half word (promoted from half word (16 bits) to word (32 bits), and word (promoted from word (32 bits) to double-word (64 bits); a 4x promotion is valid for a data element size of byte (promoted from byte (8 bit) to word (32 bit) and half word (promoted from half word (16 bit) to double-word (64 bit); and an 8x promotion is only valid for a data element size of byte (promoted from byte (8 bit) to double-word (64 bit). Promotion will be further explained below.

Table size field 1902 (bits 16 to 23) sets the table size. Table Size field 1902 is decoded as shown in Table 5.

TABLE 5

| Table Size | Size |
|---|---|
| 0000 0000 | 0.0 Kbytes |
| 0000 0001 | 1.0 Kbytes |
| 0000 0010 | 2.0 Kbytes |
| 0000 0011 | 4.0 Kbytes |
| 0000 0100 | 8.0 Kbytes |
| 0000 0101 | 16.0 Kbytes |
| 0000 0110 | 32.0 Kbytes |
| 0000 0111-1111 1111 | Reserved |

The table base address stored in the corresponding look up table base address register must be aligned to the table size specified in the look up table configuration register.

Weight Size (WSIZE) field 1903 (bits 11 to 13) indicates the size of weight values in a source register for weighted histogram operations, described in further detail below. Weight Size field 1903 is decoded as shown in Table 6.

TABLE 6

| WEIGHT SIZE | Description |
|---|---|
| 000 | Byte/8 bits |
| 001 | Half word/16 bits |
| 010-111 | Reserved |

Interpolation field 1904 (bits 8 to 10) indicates a number of successive elements written to a destination register in response to a look up table read instruction, described in further detail below. Interpolation field 1904 is decoded as shown in Table 7.

TABLE 7

| Interpolation | Description |
|---|---|
| 000 | No interpolation, only indexed element per table is written |
| 001 | Returns 2 elements per table |
| 010 | Returns 4 elements per table |
| 011 | Returns 8 elements per table |
| 100-111 | Reserved |

An interpolation field 1904 coding of 000 designates no interpolation, where only the indexed element per table is written from the look up table to a destination register. An interpolation field 1904 coding of 001 designates interpolating 2 elements, where the indexed element and an additional, adjacent element per table are written from the look up table into the destination register. An interpolation field 1904 coding of 010 designates interpolating 4 elements, where the indexed element and an additional, adjacent 3 elements per table are written from the look up table into the destination register. An interpolation field 1904 coding of 011 designates interpolating 8 elements, where the indexed element and an additional, adjacent 7 elements per table are written from the look up table into the destination register. In one example embodiment, the interpolation field 1904 (in conjunction with the number of tables field 1908, explained below) cannot exceed the maximum number of elements that can be returned by L1D 123, which in one example is 16 elements. Thus, in such an embodiment, no interpolation is possible when the number of tables field 1908 indicates 16 tables; a maximum of 2-element interpolation is possible when the number of tables field 1908 indicates 8 tables; a maximum of 4-element interpolation is possible when the number of tables field 1908 indicates 4 tables; and a maximum of 8-element interpolation is possible when the number of tables field 1908 indicates 2 tables or 1 table.

Saturation (SAT) field 1905 (bit 7) indicates whether to saturate histogram bin entries to min/max values in response to a histogram operation, described in further detail below. If the saturation field 1905 is 1, then histogram bin entries are saturated to min/max values of the element data type. For example, unsigned bytes saturate to [0, 0xFF]; signed bytes saturate to [0x80, 0x7F]; unsigned half-words saturate to [0, 0xFFFF]; signed half-words saturate to [0x8000, 0x7FFF]; unsigned words saturate to [0, 0xFFFF FFFF]; and signed words saturate to [0x8000 0000, 0x7FFF FFFF]. If the saturation field 1905 is 0, then histogram bin entries do not saturate to min/max values of the element data type and instead will wrap around when incremented or decremented beyond a minimum value or maximum value, respectively.

Signed field 1906 (bit 6) indicates whether processor 100 treats the recalled look up table elements as signed integers or unsigned integers. If the signed field 1906 is 1, processor 100 treats the look up table elements as signed integers. If the signed field 1906 is 0, processor 100 treats the look up table elements as unsigned integers.

Element Size (ESIZE) field 1907 (bits 3 to 5) indicate the look up table element size. Element Size field 1907 is decoded as shown in Table 8.

TABLE 8

| ELEMENT SIZE | Description |
|---|---|
| 000 | byte/8 bits |
| 001 | half word/16 bits |
| 010 | word/32 bits |
| 011-111 | reserved |

Number of Tables (NTBL) field 1908 (bits 0 to 2) indicates the number of tables to be looked up in parallel. Number of Tables field 1908 is decoded as shown in Table 9.

TABLE 9

| NUMBER OF TABLES | Description |
|---|---|
| 000 | 1 table |
| 001 | 2 tables |
| 010 | 4 tables |
| 011 | 8 tables |
| 100 | 16 tables |
| 101-111 | reserved |

A look up table enable register 2000 specifies the type of operations permitted for a particular table set. This is illustrated in FIG. 20. As shown in FIG. 20, this example employs a field in a single register to control a corresponding one of the four table sets. Field 2001 controls table set 3. Field 2002 controls table set 2. Field 2003 controls table set 1. Field 2004 controls table set 0. Table Enable fields 2001, 2002, 2003 and 2004 are each decoded as shown in Table 10.

TABLE 10

| TABLE ENABLE | Description |
|---|---|
| 00 | no look up table operations |
| 01 | read operations allowed |
| 10 | reserved |
| 11 | read and write operations allowed |

If the table set field is 01, then read operations are permitted from the corresponding look up table base address register and the corresponding look up table configuration register. If the table set field is 11, then read operations are permitted from and write operations are permitted to the corresponding look up table base address register and the corresponding look up table configuration register. If the table set field is 00, then no look up table operations are permitted.

Each look up table instruction specifies a vector register as an operand. This vector register is treated as a set of 32-bit look up table indices by the look up table operation corresponding to the instruction. Table 11 shows the coding of the vector indices in the vector operand register based upon the number tables for the set of tables controlled by Number of Tables field 1908 of the corresponding look up table configuration register.

TABLE 11

| Vector Register bits | Index | 1 table | 2 tables | 4 tables | 8 tables | 16 tables |
|---|---|---|---|---|---|---|
| Vx[31:0] | index0 | valid | valid | valid | valid | valid |
| Vx[63:32] | index1 | — | valid | valid | valid | valid |
| Vx[95:64] | index2 | — | — | valid | valid | valid |
| Vx[127:96] | index3 | — | — | valid | valid | valid |
| Vx[159:128] | index4 | — | — | — | valid | valid |
| Vx[191:160] | index5 | — | — | — | valid | valid |
| Vx[223:192] | index6 | — | — | — | valid | valid |
| Vx[255:224] | index7 | — | — | — | valid | valid |
| Vx[287:256] | index8 | — | — | — | — | valid |
| Vx[319:288] | index9 | — | — | — | — | valid |
| Vx[351:320] | index10 | — | — | — | — | valid |
| Vx[383:352] | index11 | — | — | — | — | valid |
| Vx[415:384] | index12 | — | — | — | — | valid |
| Vx[447:416] | index13 | — | — | — | — | valid |
| Vx[479:448] | index14 | — | — | — | — | valid |
| Vx[511:480] | index15 | — | — | — | — | valid |

Depending upon the number of tables specified in the Number of Tables field 1908 of the corresponding look up table configuration register 1900, the vector register bits specify various indices. The address for a table element within the first table for look up table operation is the base address stored in the base address register plus the index specified by bits 0 to 31 of the vector register values. The address for a table element within the second table for look up table operation (assuming at least two tables are specified by number of tables field 1908) is the base address stored in the base address register plus the index specified by bits 32 to 63 of the vector register. Similarly, the vector register specifies an offset for each table specified.

Figure 21:
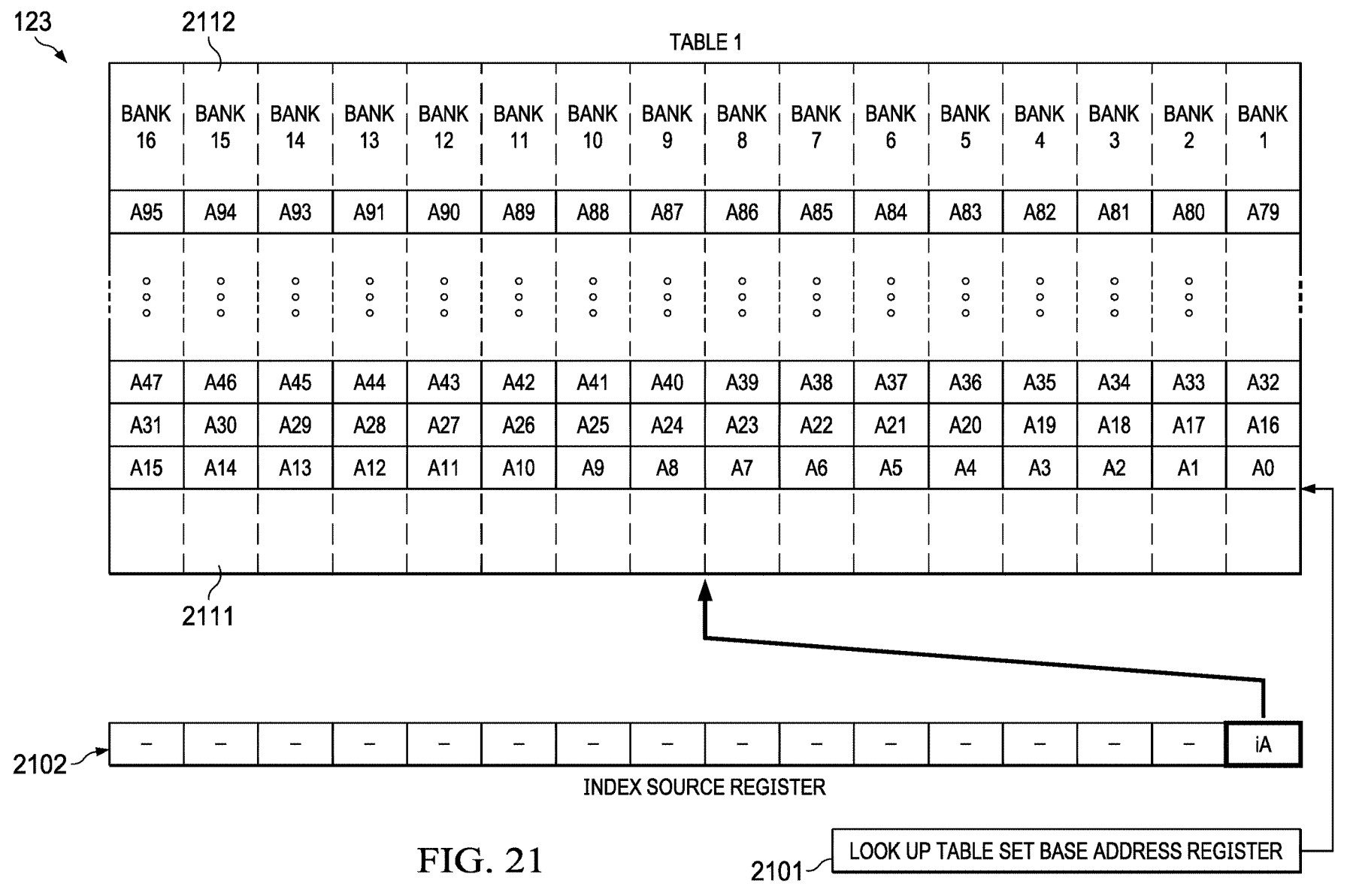

FIG. 21 illustrates look up table organization when the corresponding look up table configuration register 1900 specifies one table for that table set. Level one data cache 123 includes a portion of directly addressable memory, including portion 2111 below the look up table, the look up table, and a portion 2112 above the look up table. The corresponding look up table set base address register 2101 specifies the beginning of the table set. In the example of FIG. 21, the number of tables field 1908 specifies a single table. The end of the memory allocated to the table set is specified by the table size field 1902. Index source register 2102 specifies a single offset (index iA) used to address the table. As shown in FIG. 21, the single table employs all 16 banks of memory.

Figure 22:
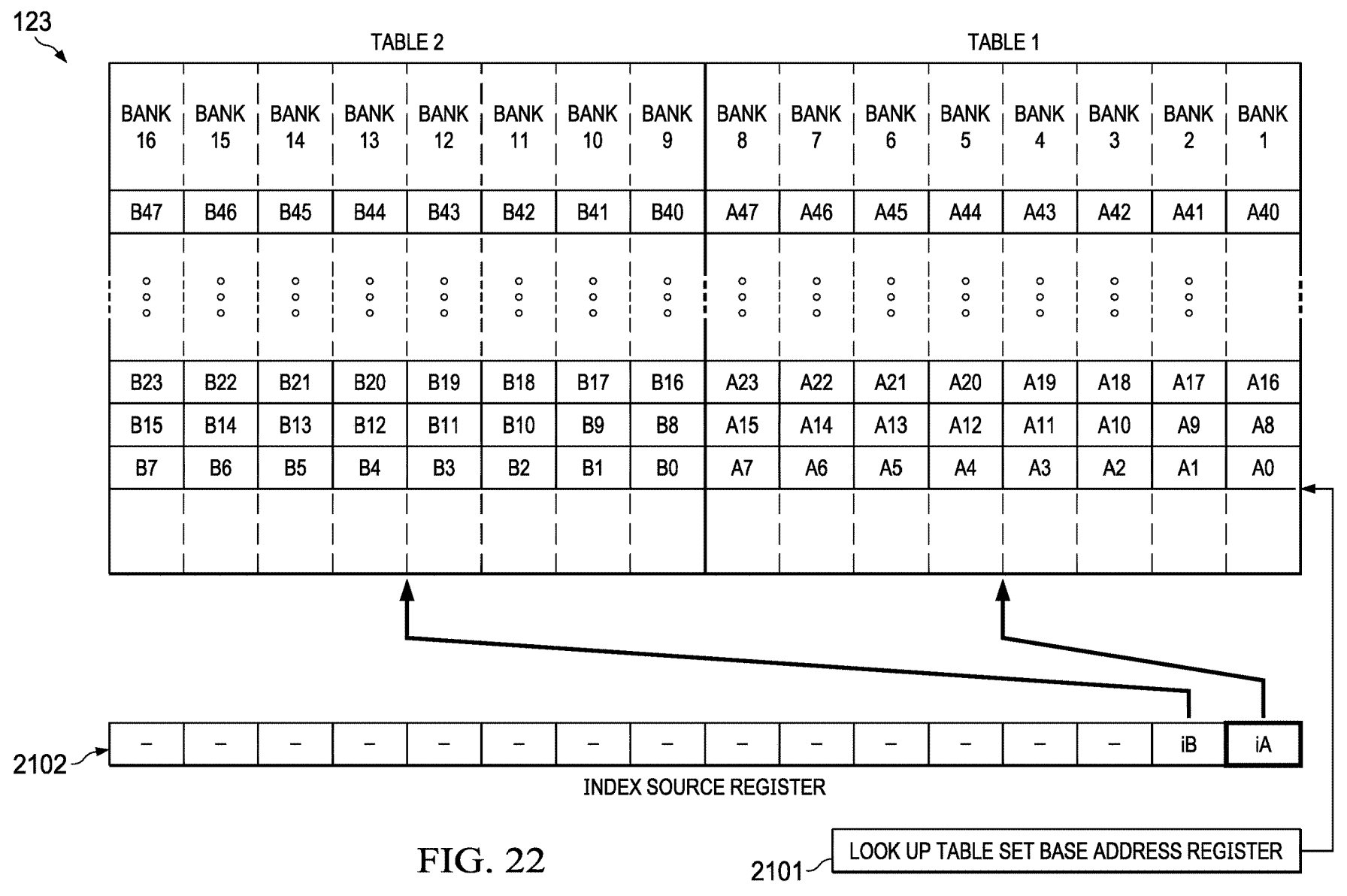

FIG. 22 illustrates look up table organization when the corresponding look up table configuration register 1900 specifies two tables for that table set. The look up table set base address register 2101 specifies the beginning of the table set. The number of tables field 1908 specifies two tables. The end of the memory allocated to the table set is specified by the table size field 1902. Index source register 2102 specifies two offsets used to address the tables. A first index iA addresses Table 1 and a second index iB addresses Table 2. Table 1 data is stored in memory banks 1 to 8. Table 2 data is stored in memory banks 9 to 16.

Figure 23:
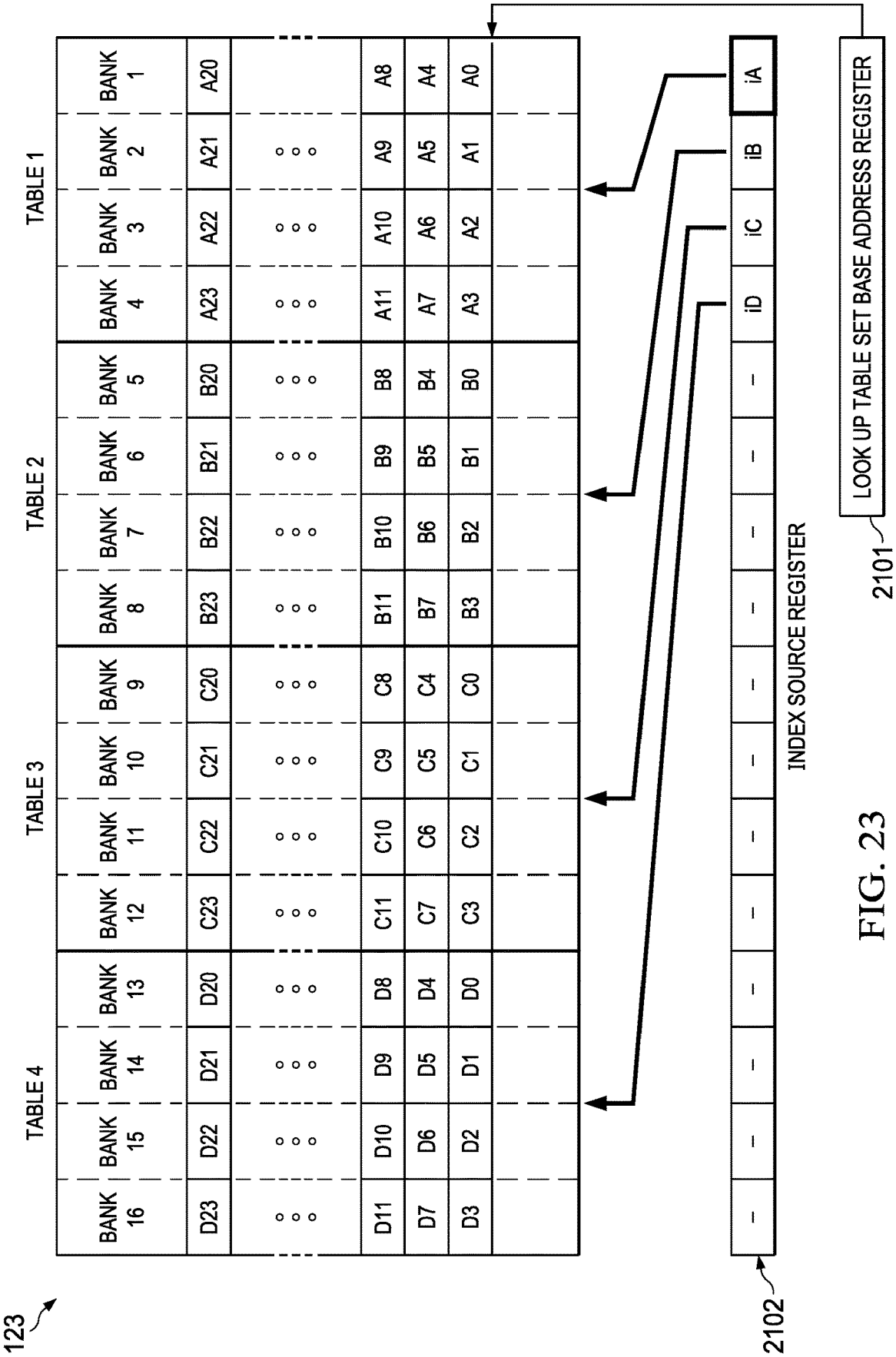
FIG. 23 illustrates look up table organization for four tables for that table set.

FIG. 23 illustrates look up table organization when the corresponding look up table configuration register 1900 specifies four tables for that table set. The look up table set base address register 2101 specifies the beginning of the table set. The number of tables field 1908 specifies four tables. The end of the memory allocated to the table set is specified by the table size field 1902. Index source register 2102 specifies four offsets used to address the tables. A first index iA addresses Table 1, a second index iB addresses Table 2, a third index iC addresses Table 3 and a fourth index iD addresses Table 4. Table 1 data is stored in memory banks 1 to 4. Table 2 data is stored in memory banks 5 to 8. Table 3 data is stored in memory banks 9 to 12. Table 4 data is stored in memory banks 13 to 16.

Figure 24:
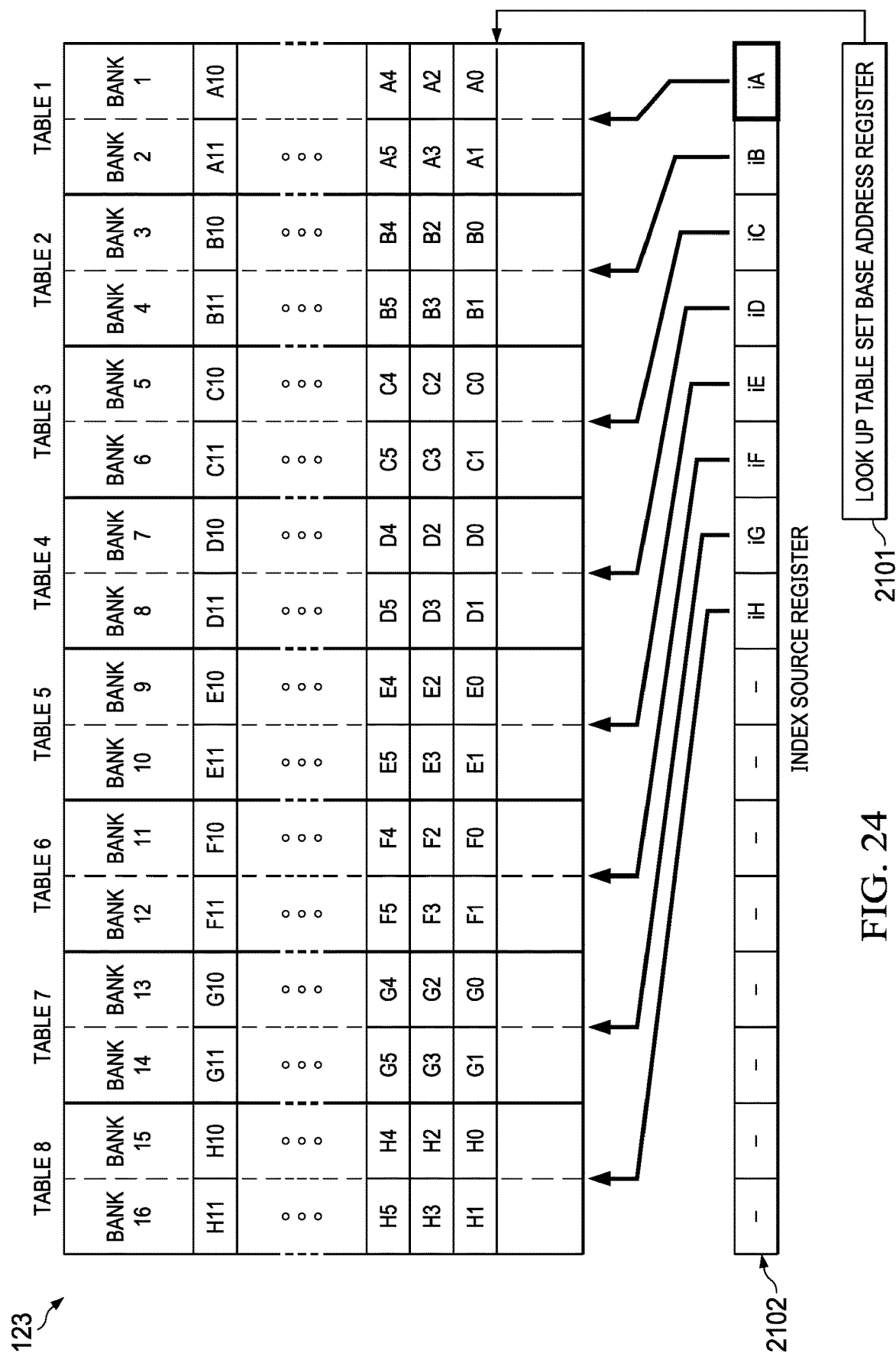
FIG. 24 illustrates look up table organization for eight tables for that table set.

FIG. 24 illustrates look up table organization when the corresponding look up table configuration register 1900 specifies eight tables for that table set. The look up table set base address register 2101 specifies the beginning of the table set. The number of tables field 1908 specifies eight tables. The end of the memory allocated to the table set is specified by the table size field 1902. Index source register 2102 specifies a eight offsets used to address the tables. A first index iA addresses Table 1, a second index iB addresses Table 2, a third index iC addresses Table 3, a fourth index iD addresses Table 4, a fifth index iE addresses Table 5, a sixth index iF addresses Table 6, a seventh index iG addresses Table 7, and an eighth index iH addresses Table 8. Table 1 data is stored in memory banks 1 and 2. Table 2 data is stored in memory banks 3 and 4. Table 3 data is stored in memory banks 5 and 6. Table 4 data is stored in memory banks 7 and 8. Table 5 data is stored in memory banks 9 and 10. Table 6 data is stored in memory banks 11 and 12. Table 7 data is stored in memory banks 13 and 14. Table 8 data is stored in memory banks 15 and 16.

Figure 25:
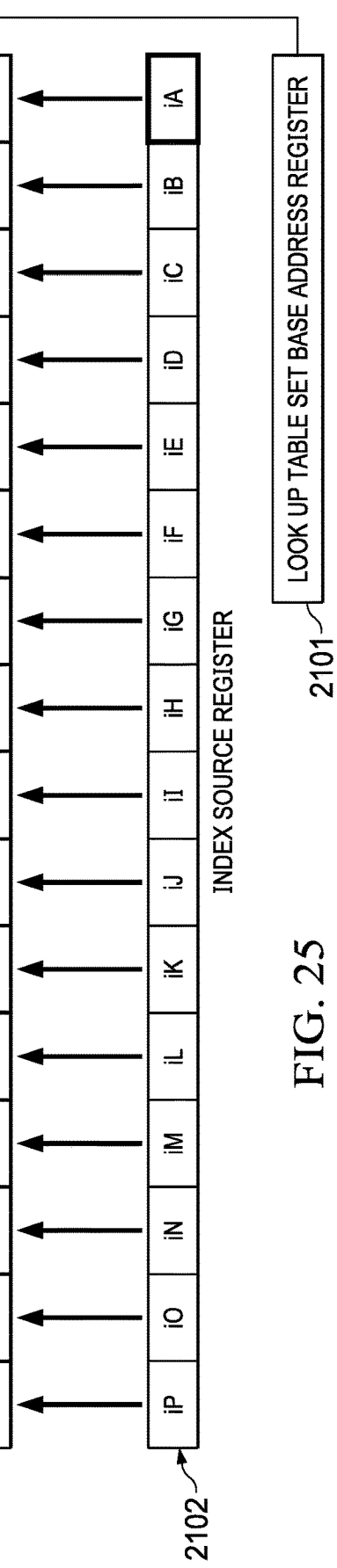
FIG. 25 illustrates look up table organization for sixteen tables for that table set.

FIG. 25 illustrates look up table organization when the corresponding look up table configuration register 1900 specifies sixteen tables for that table set. The look up table set base address register 2101 specifies the beginning of the table set. The number of tables field 1908 specifies sixteen tables. The end of the memory allocated to the table set is specified by the table size field 1902. Index source register 2102 specifies sixteen offsets used to address the tables. A first index iA addresses Table 1, a second index iB addresses Table 2, a third index iC addresses Table 3, a fourth index iD addresses Table 4, a fifth index iE addresses Table 5, a sixth index iF addresses Table 6, a seventh index iG addresses Table 7, an eighth index iH addresses Table 8, a ninth index iI addresses Table 9, a tenth index iJ addresses Table 10, an eleventh index iK addresses Table 11, a twelfth index iL addresses Table 12, a thirteenth index iM addresses Table 13, a fourteenth index iN addresses Table 14, a fifteenth index iO addresses Table 15, and a sixteenth index iP addresses Table 16. Table 1 data is stored in memory bank 1. Table 2 data is stored in memory bank 2. Table 3 data is stored in memory bank 3. Table 4 data is stored in memory bank 4. Table 5 data is stored in memory bank 5. Table 6 data is stored in memory bank 6. Table 7 data is stored in memory bank 7. Table 8 data is stored in memory bank 8. Table 9 data is stored in memory bank 9. Table 10 data is stored in memory bank 10. Table 11 data is stored in memory bank 11. Table 12 data is stored in memory bank 12. Table 13 data is stored in memory bank 13. Table 14 data is stored in memory bank 14. Table 15 data is stored in memory bank 15. Table 16 data is stored in memory bank 16.

Below is the form of a look up table read (LUTRD) instruction in accordance with one example embodiment.

LUTRD tbl_index, tbl_set, dst

Tbl_index is an instruction operand specifying a vector register (such as within general vector register file 231) by register number. This is interpreted as index numbers as shown in Table 11. Tbl_set is a number [0:3] specifying the table set employed in the instruction. This named table set number specifies: a corresponding look up table base address register storing the table base address, which may a scalar register or a vector register; a corresponding look up table configuration register (FIG. 19), which may a scalar register or a vector register; and the corresponding operative portion of the look up table enable register (FIG. 20), which may a scalar register or a vector register. The look up table base address register corresponding to the named table set determines the base address of the table set. The indices of the vector register named by Tbl_index are offset from this table set base address. The look up table configuration register corresponding to the named table set determines: the promotion mode (Table 4); the amount of memory allocated to the table size (Table 5); the weight size for histogram operations (Table 6); n-element interpolation for look up table read operations (Table 7); whether values are to be treated as signed or unsigned; whether histogram bin entries are saturated to min/max values; the data element size (Table 8); and the number of tables in the table set (Table 9). Dst is an instruction operand specifying a vector register (such as within general vector register file 231) by register number as the destination of the table look up operation. The data recalled from the table as specified by these other parameters is packed and stored in this destination register. The process of promotion does not add any performance penalty.

Figure 26:
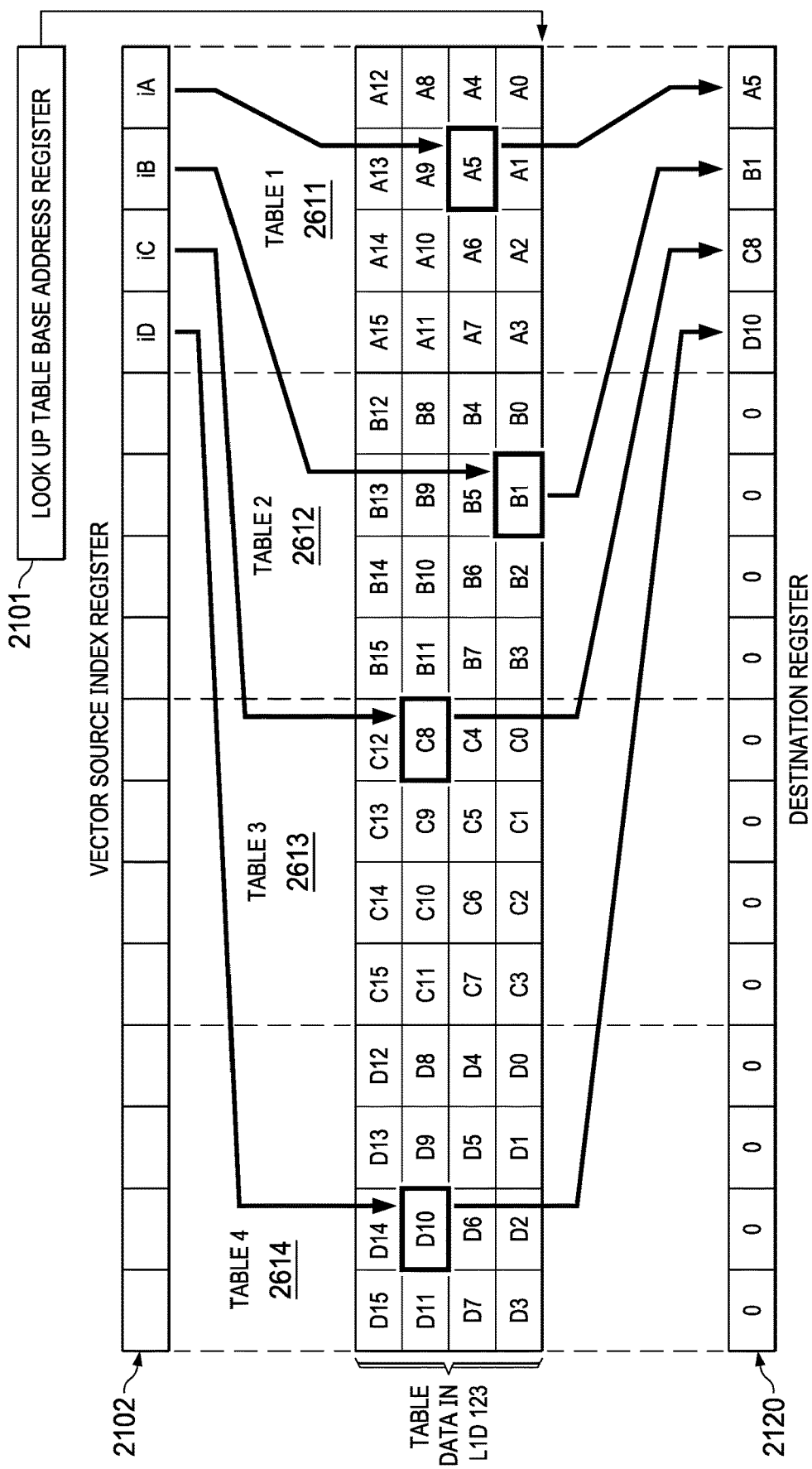
FIG. 26 illustrates an example of the operation of the look up table read instruction for four parallel tables, a data element size of byte and no promotion in accordance with an example embodiment.

FIG. 26 illustrates an example of the operation of the look up table read instruction of this invention. In the example illustrated in FIG. 26, the corresponding look up table configuration register (1900) specifies four parallel tables, a data element size of byte (8 bits), and no promotion. To perform look up table operations, the look up table enable register field (in register 2000) corresponding to the selected table set must enable either read operation (01) or both read and write operations (11).

The look up table base address register 2101 corresponding to the specified table set stores the base address for the look up table set as illustrated schematically in FIG. 26. The table data is stored in a portion of level one data cache 123 configured as directly accessible memory, such as disclosed in U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

The example illustrated in FIG. 26 has four tables: table 1 2611; table 2 2612; table 3 2613; and table 4 2614. As shown in Table 11, this instruction with these selected options treats the data stored in vector source index register 2102 as a set of 4 32-bit fields specifying table offsets. The first field (bits Vx[31:0]) stores iA, the index into the first table 2611. In this example, this indexes to element A5. The second field (bits Vx[63:32]) stores iB, the index into the second table 2612. In this example, this indexes to element B1. The third field (bits Vx[95:64]) stores iC, the index into the third table 2613. In this example, this indexes to element C8. The fourth field (bits Vx[127:96]) stores iD, the index into the fourth table 2614. In this example, this indexes to element D10. The various indices are the memory address offsets from the base address for the table set to the specified data element. In accordance with the operation of this look up table read instruction, the indexed data element in table 1 2611 (A5) is stored in a first data slot in destination register 2120. The indexed data element in table 2 2612 (B1) is stored in a second data slot in destination register 2120. The indexed data element in table 3 2613 (C8) is stored in a third data slot in destination register 2120. The indexed data element in table 4 2614 (D10) is stored in a fourth data slot in destination register 2120. In accordance with this example implementation, other data slots of destination register 2120 are zero filled.

The look up table read instruction maps the data recalled from the table(s) directly to vector lanes of destination register 2120. The instruction maps earlier elements to lower lane numbers and later elements to higher lane numbers. The look up table read instruction deposits elements in vectors in increasing-lane order. The look up table read instruction fills each vector lane of destination register 2120 with elements recalled from the table(s). If the recalled data does not equal the vector length, the look up table read instruction pads the excess lanes of destination register 2120 with zeros.

Figure 27:
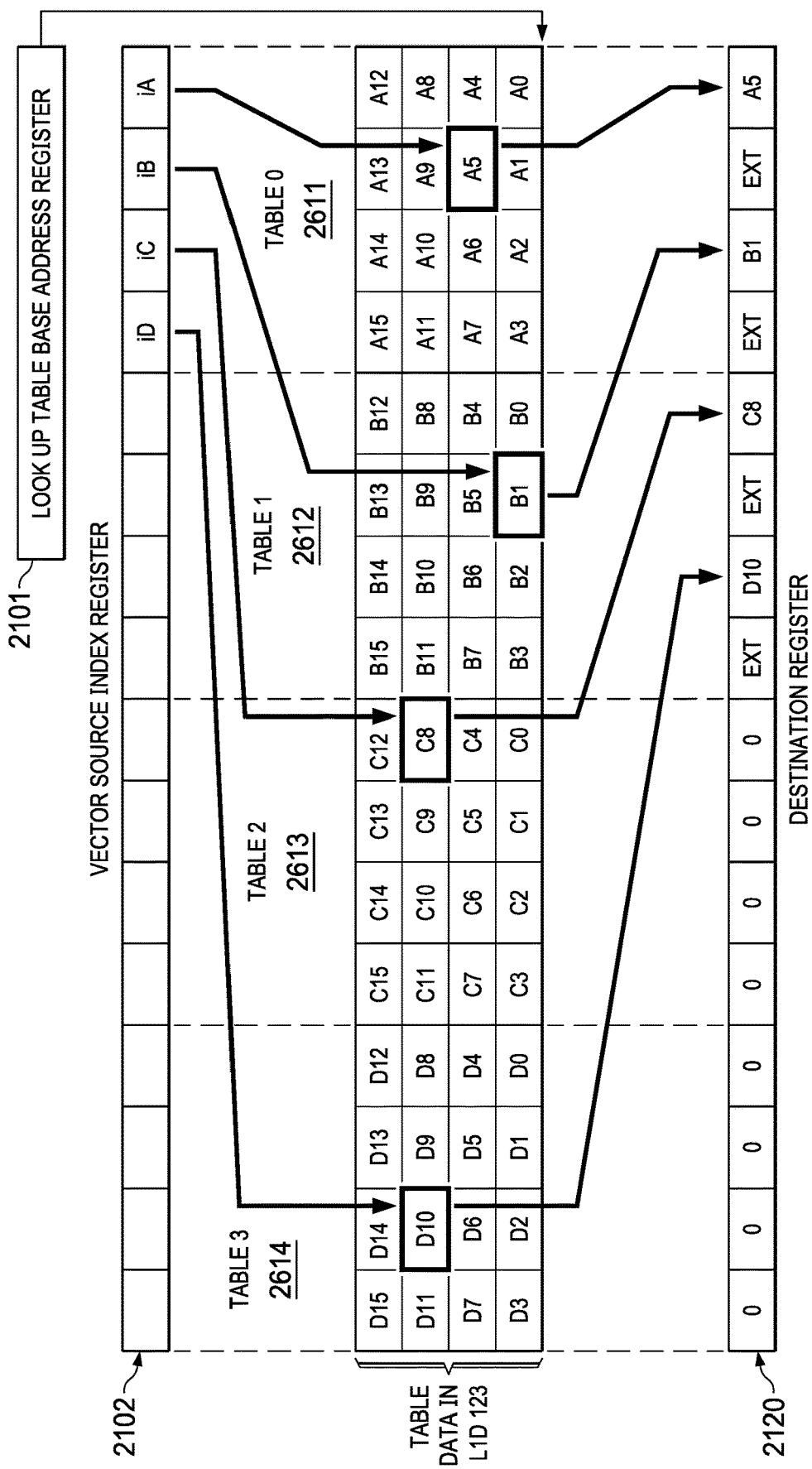
FIG. 27 illustrates an example of the operation of the look up table read instruction for four parallel tables, a data element size of byte and 2× promotion in accordance with an example embodiment.

When a promotion mode is enabled (promotion field 1901 of the corresponding look up table configuration register 1900≠00), the look up table read instruction promotes each recalled data element to a larger size. FIG. 27 illustrates an example of the operation of the look up table read instruction in accordance with an example embodiment. FIG. 27 illustrates an operation similar to FIG. 26 except that a 2× promotion is enabled (promotion field 1901 is 01). As in FIG. 26, each of the four indices of vector source index register 2102 recalls a data element from a corresponding table. FIG. 27 illustrates these are placed in destination register 2120 differently than in FIG. 26. Each recalled data element is stored in a slot in destination register 2120 together with an equally sized extension. This extension is formed corresponding to the signed/unsigned indication of signed field 1906 of the corresponding look up table configuration register. If signed field 1906 indicates unsigned (0), then the extension is zero filled. If signed field 1906 indicates signed (1), then the extension slot is filled with the same value as the most significant bit (sign bit) of the corresponding data element. This treats the data element as a signed integer.

Figure 28:
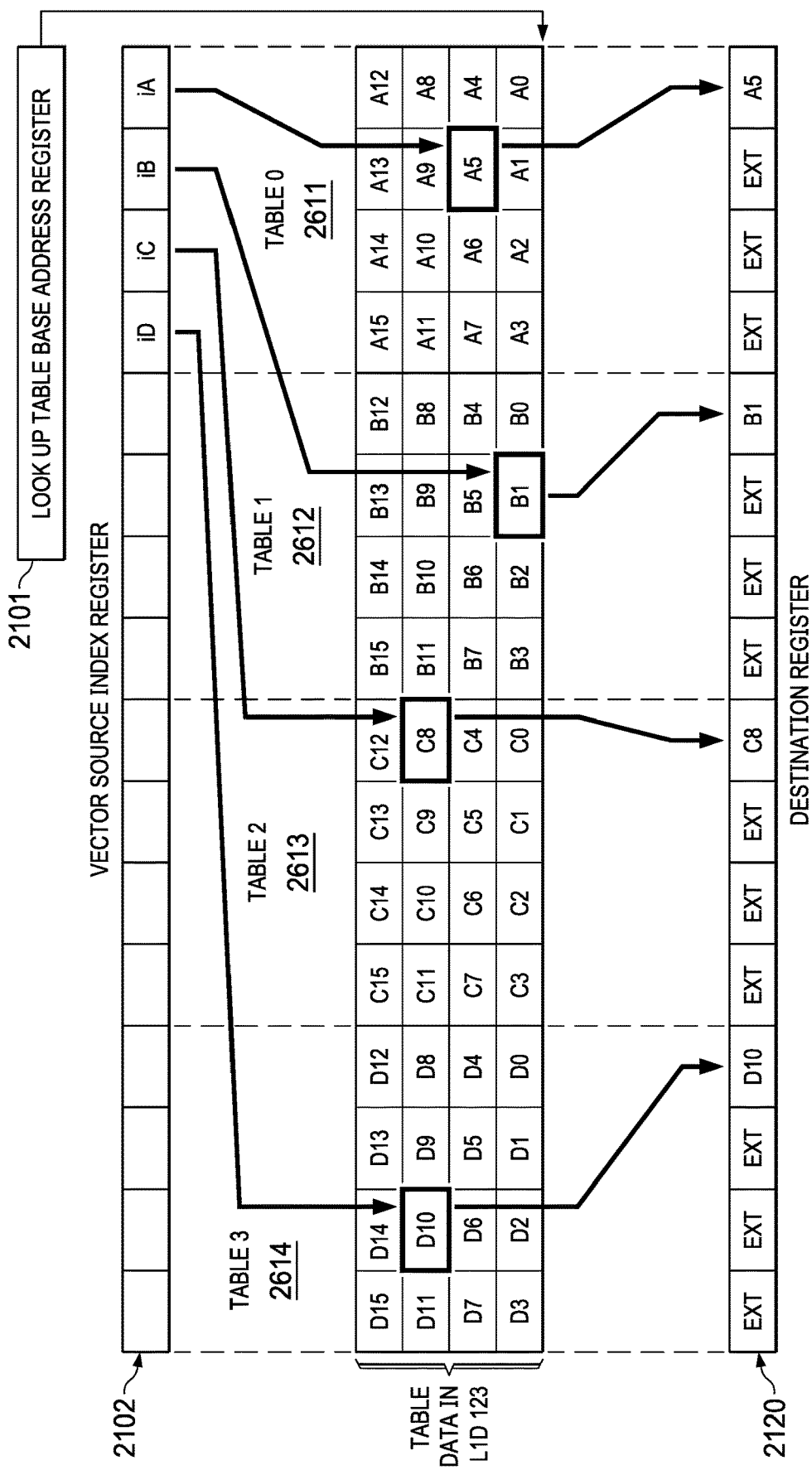
FIG. 28 illustrates an example of the operation of the look up table read instruction for four parallel tables, a data element size of byte and 4× promotion in accordance with an example embodiment.

FIG. 28 illustrates an example of the operation of the look up table read instruction in accordance with an example embodiment. FIG. 28 illustrates an operation similar to FIG. 26 except that a 4× promotion is enabled (promotion field 1901 is 10). Each of four indices of vector source index register 2102 recalls a data element from each table. FIG. 28 illustrates these are placed in destination register 2120 differently than in FIG. 26. Each recalled data element is stored in a slot in destination register 2120 together with three equally sized extensions. These extensions are formed corresponding to the signed/unsigned indication of signed field 1906 of the corresponding look up table configuration register.

Those skilled in the art would understand that other data element sizes (e.g., half word, word) would be similarly implemented. Further, other promotion factors, such as a promotion factor of 8×, would be similarly achieved. Those skilled in the art would understand how to apply the principles described in this disclosure to other numbers of look up tables within the selected set of tables.

Figure 29A:
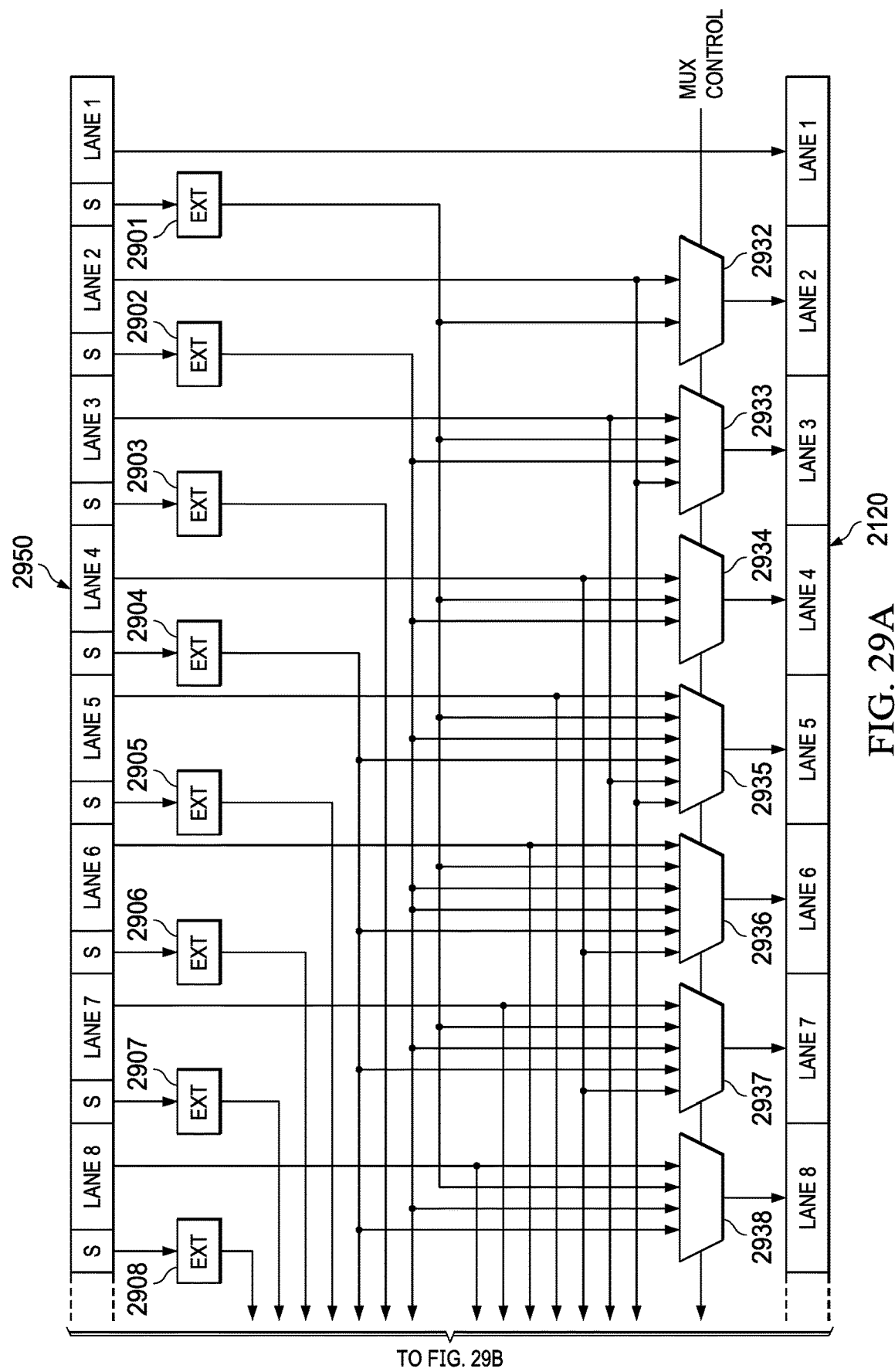
FIGS. 29A and 29B together illustrate an example embodiment of implementation of the promotion.
Figure 29B:
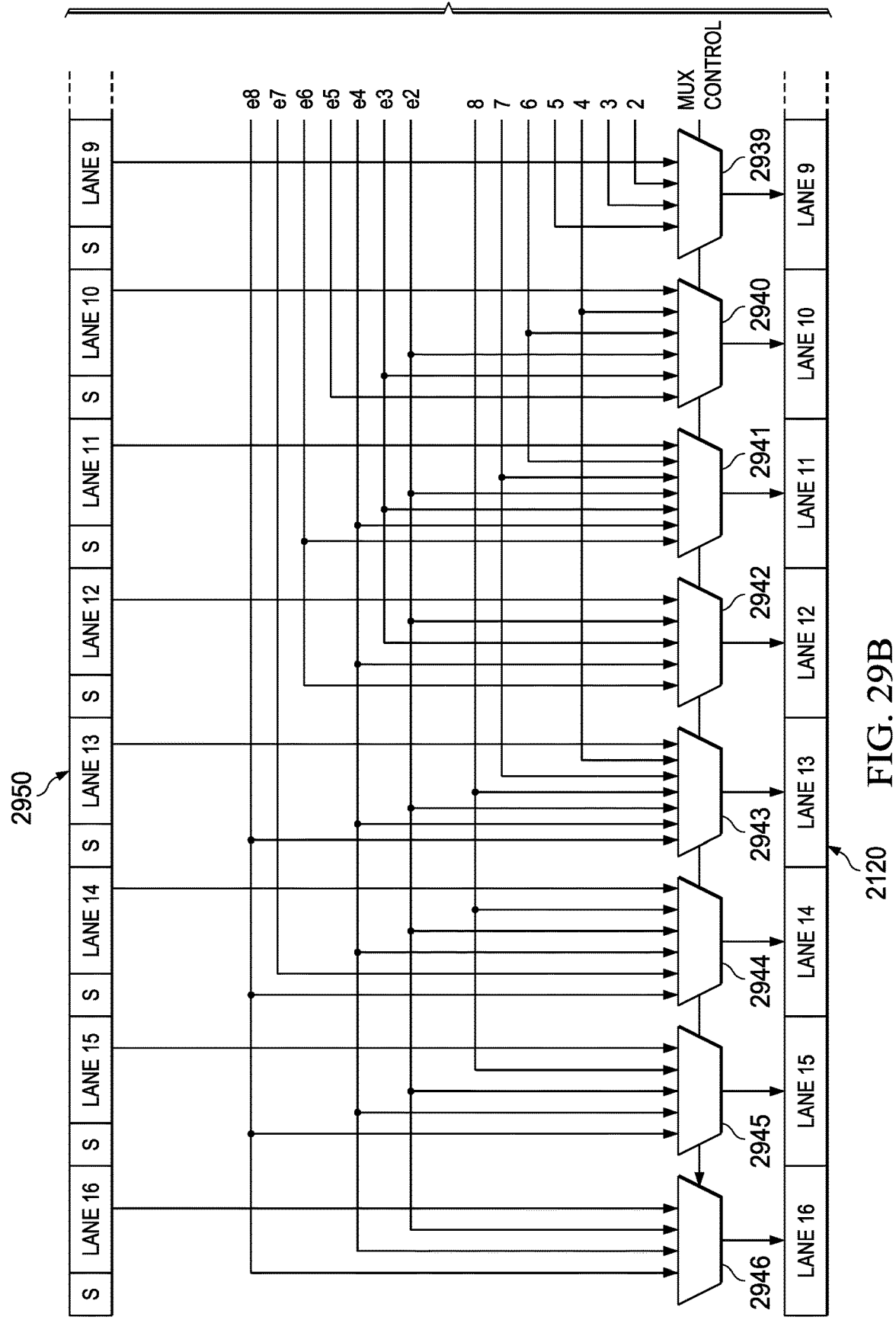

FIGS. 29A and 29B together illustrate an example embodiment of implementation of promotion. Temporary register 2950 receives table data recalled from level one data cache 123. Temporary register 2950 includes 16 bytes arranged in 16 1-byte blocks lane 1 to lane 16. Note that these lanes are each equal in length to the minimum of data size specifiable in element size field 1907. In this example that is 1 byte/8 bits. Extension elements 2901 to 2908 form the extensions to respective lanes 1 to 8. A plurality of multiplexers 2932 to 2946 couple input lanes from temporary register 2950 to corresponding lanes of destination register 2120. Not all input lanes of temporary register 2950 are coupled to every multiplexer 2932 to 2946. Many multiplexers 2932 to 2946 also receive an extension input and one or more extension elements 2901 to 2908. Note there is no multiplexer supplying lane 1 of output register 2120. Lane 1 of destination register 2120 is always supplied by lane 1 of temporary register 2950 in this illustrated embodiment.

Figure 30:
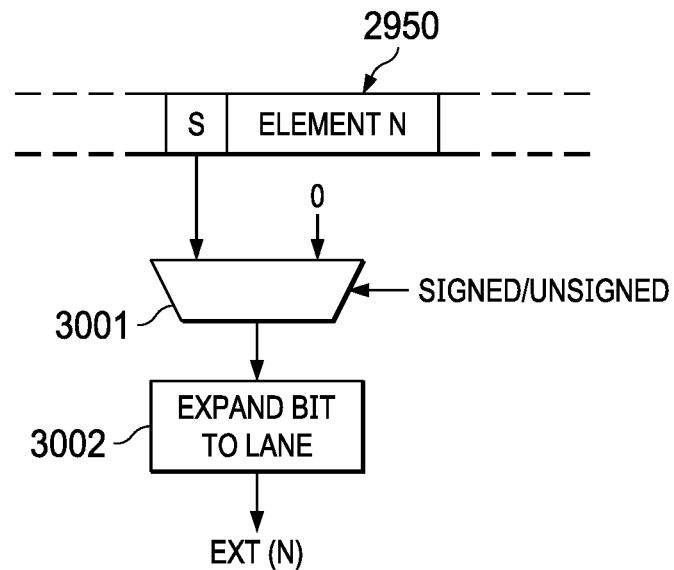
FIG. 30 illustrates an example of an extension element illustrated in FIG. 29A.

FIG. 30 illustrates an exemplary extension element N of FIG. 29A. The sign bit (S) of data element N of temporary register 2950 supplies one input of a corresponding extension multiplexer 3001. The sign bit of a signed integer is the most significant bit of the value as shown in FIG. 30. A constant 0 supplies a second input of multiplexer 3001. Multiplexer 3001 and other similar multiplexers corresponding to other input data elements are controlled by a signed/unsigned signal. This signed/unsigned signal based upon signed field 1906 of the corresponding look up table configuration register 1900. If signed field 1906 is 0, then multiplexer 3001 (and the corresponding multiplexers for other input lanes) selects the constant 0 input. If signed field 1906 is 1, then multiplexer 3001 (and the corresponding multiplexers for other input lanes) selects the sign bit input. The selected extension is supplied to expansion element 3002. Expansion element 3002 expands the bit selected by multiplexer 3001 to the lane size. In accordance with this example, the lane size is selected to equal the minimum table data element size of 1 byte. For a specified table data size equal to the lane size and in which the signed field 1906 is 0, the next data slot is filled with 0's effecting a zero extension. If signed field 1906 is 1, the next data slot is filled with the sign bit of the data element effecting a sign extension. Multiplexers 2932 to 2946 select the proper extension corresponding to the specified table data element size. If the selected table data element size is half word, multiplexers 2932 to 2946 are controlled to select the extension from alternating extension elements. If the selected table data element size is word, multiplexers 2932 to 2946 are controlled to select the extension from every fourth extension element.

Figure 31:
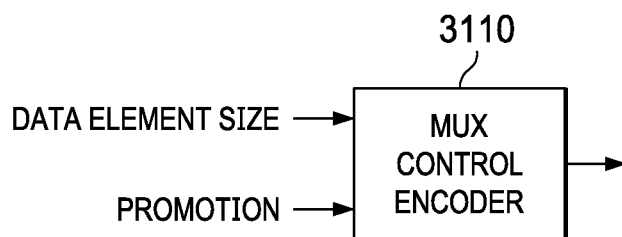
FIG. 31 illustrates a multiplex control encoder controlling multiplexers illustrated in FIGS. 29A and 29B.

Multiplexers 2932 to 2946 are controlled by multiplexer control encoder 3110 illustrated in FIG. 31. Multiplexer control encoder 3110 receives an element data size input (element size field 1907), a promote indication (promotion field 1901) and generates corresponding control signals for multiplexers 2932 to 2946. Not all input bytes can supply each output byte. Table 12 illustrates this control. Table 12 shows the source data for each of the 16 lanes of destination register 2120 for the various data sizes and promotion modes in accordance with an example embodiment.

TABLE 12

|       | 16 | 15 | 14 | 13 | 12 | 11 | 10 | 9 | 8  | 7  | 6  | 5  | 4  | 3  | 2  | 1 |
|-------|----|----|----|----|----|----|----|---|----|----|----|----|----|----|----|---|
| --1×  | 16 | 15 | 14 | 13 | 12 | 11 | 10 | 9 | 8  | 7  | 6  | 5  | 4  | 3  | 2  | 1 |
| b-2×  | e8 | 8  | e7 | 7  | e6 | 6  | e5 | 5 | e4 | 4  | e3 | 3  | e2 | 2  | e1 | 1 |
| b-4×  | e4 | e4 | e4 | 4  | e3 | e3 | e3 | 3 | e2 | e2 | e2 | 2  | e1 | e1 | e1 | 1 |
| b-8×  | e2 | e2 | e2 | e2 | e2 | e2 | e2 | 2 | e1 | e1 | e1 | e1 | e1 | e1 | e1 | 1 |
| hw-2× | e8 | e8 | 8  | 7  | e6 | e6 | 6  | 5 | e4 | e4 | 4  | 3  | e2 | e2 | 2  | 1 |
| hw-4× | e4 | e4 | e4 | e4 | e4 | e4 | 4  | 3 | e2 | e2 | e2 | e2 | e2 | e2 | 2  | 1 |
| w-2×  | e8 | e8 | e8 | e8 | 8  | 7  | 6  | 5 | e4 | e4 | e4 | e4 | 4  | 3  | 2  | 1 |

Note that lane 1 of destination register 2120 is always the same as lane 1 of temporary register 2950 regardless of selected data size or promotion factor. The column devoted to lane 1 includes all 1's and FIG. 29A illustrates a straight connection between lane 1 of temporary register 2950 and destination register 2120. The first row of Table 12 shows that for no promotion (1×), each lane of destination register 2120 is the same as temporary register 2950 regardless of the selected table data element data size. For a data size of byte and a promotion factor of 2 (b-2×), multiplexer 2932 selects the extension of lane 1 (e1), multiplexer 2933 selects the data of input lane 2, multiplexer 2934 selects the extension of lane 2 (e2), multiplexer 2935 selects the data of input lane 3, multiplexer 2936 selects the extension of lane 3 (e3), etc. For a data size of byte and a promotion factor of 4 (b-4×), multiplexers 2932 to 2934 select the extension of lane 1 (e1), multiplexer 2935 selects the data of input lane 2 and multiplexers 2936 to 2938 select the extension of lane 2 (e2), multiplexer 2939 selects the data of input lane 3, multiplexers 2940 to 2942 select the extension of lane 3 (e3), etc. For a data size of byte and a promotion factor of 8 (b-8×), multiplexers 2932 to 2938 select the extension of lane 1 (e1), multiplexer 2939 selects the data of input lane 2, and multiplexers 2940 to 2446 select the extension of lane 2 (e2). For a data size of half word and a promotion factor of 2 (hw-2×), multiplexer 2932 selects the data of lane 2, multiplexers 2933 and 2934 select the extension of lane 2 (e2), multiplexer 2935 selects the data of lane 3, multiplexer 2936 selects the data of lane 4, multiplexers 2937 and 2938 select the extension of lane 4 (e4), etc. For a data size of half word and a promotion factor of 4 (hw-4×), multiplexer 2932 selects the data of lane 2, multiplexers 2933 to 2938 select the extension of lane 2 (e2), multiplexer 2939 selects the data of lane 3, multiplexer 2940 selects the data of lane 4, and multiplexers 2941 and 2946 select the extension of lane 4 (e4). For a data size of word and a promotion factor of 2 (w-2×), multiplexer 2932 selects data of lane 2, multiplexer 2933 selects data of lane 3, multiplexer 2934 selects data of lane 4, multiplexers 2935 to 2938 select the extension of lane 4 (e4), multiplexer 2939 selects the data of lane 5, multiplexer 2940 selects the data of lane 6, multiplexer 2941 selects the data of lane 7, multiplexer 2942 selects the data of lane 8 and multiplexers 2943 to 2946 select the extension of lane 8. As previously described, these are all the combinations of data size and promotion factor supported in the present example.

Figure 32:
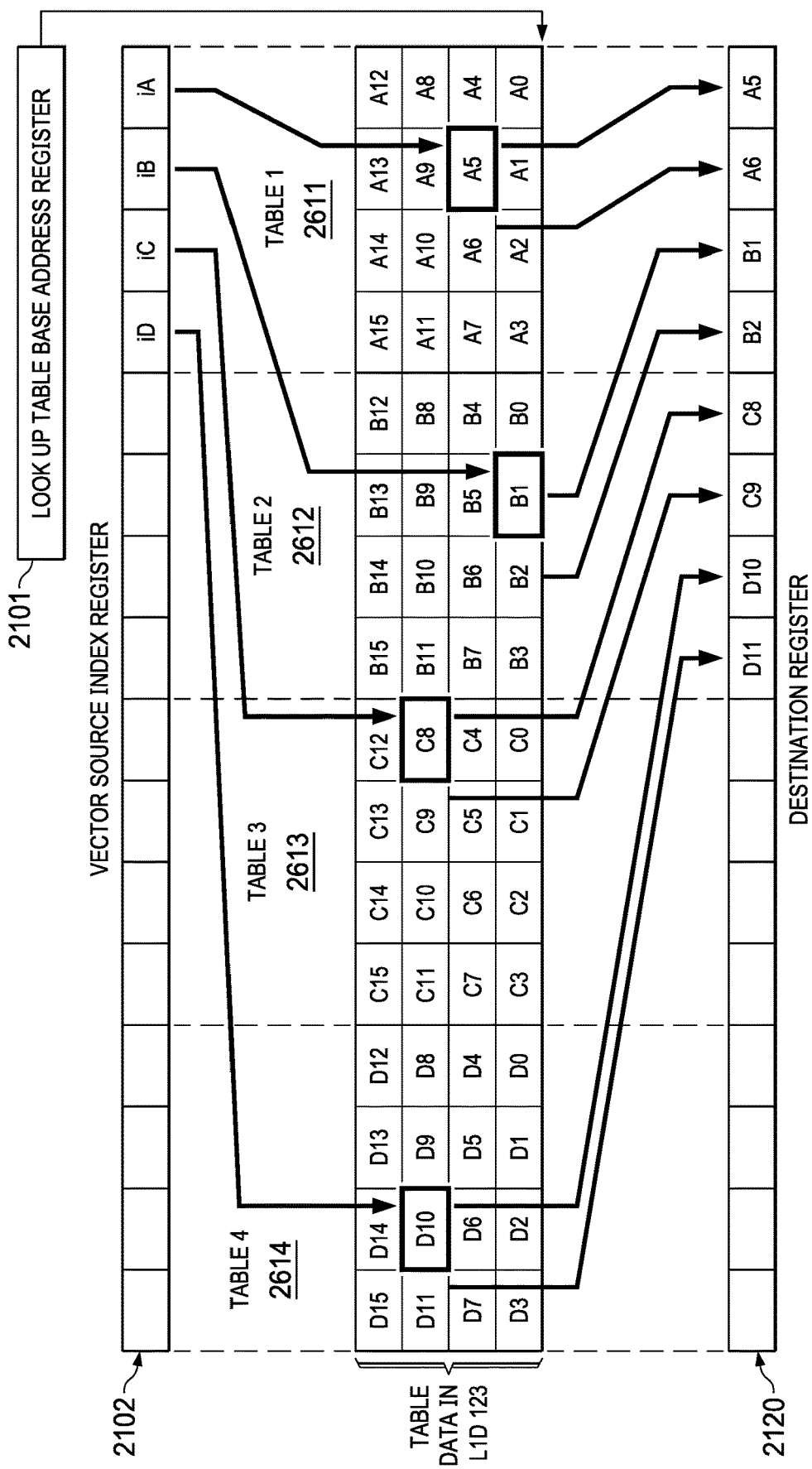
FIG. 32 illustrates an example of the operation of the look up table read instruction for four parallel tables, a data element size of word, and 2-element interpolation in accordance with an example embodiment.

FIG. 32 illustrates another example of the operation of the look up table read instruction of this disclosure. In the example illustrated in FIG. 32, the corresponding look up table configuration register (1900) specifies four parallel tables, a data element size of word (32 bits), and 2-element interpolation. To perform look up table operations, the look up table enable register field (in register 2000) corresponding to the selected table set must enable either read operation (01) or both read and write operations (11).

As above, the look up table base address register 2101 corresponding to the specified table set stores the base address for the look up table set as illustrated schematically in FIG. 32. The table data is stored in a portion of level one data cache 123 configured as directly accessible memory.

The example illustrated in FIG. 32 has four tables: table 1 2611; table 2 2612; table 3 2613; and table 4 2614. As shown in Table 11, this instruction with these selected options treats the data stored in vector source index register 2102 as a set of 4 32-bit fields specifying table offsets. The first field (bits Vx[31:0]) stores iA, the index into the first table 2611. In this example, this indexes to element A5. The second field (bits Vx[63:32]) stores iB, the index into the second table 2612. In this example, this indexes to element B1. The third field (bits Vx[95:64]) stores iC, the index into the third table 2613. In this example, this indexes to element C8. The fourth field (bits Vx[127:96]) stores iD, the index into the fourth table 2614. In this example, this indexes to element D10. The various indices are the memory address offsets from the base address for the table set to the specified data element.

When an interpolation mode is enabled (interpolation field 1904 of the corresponding look up table configuration register 1900≠00), the look up table read instruction returns one or more additional data elements than the indexed element per table. FIG. 32 illustrates an example of the operation of the look up table read instruction in accordance with an example embodiment. FIG. 32 illustrates an operation similar to FIG. 26, described above, except that a 2-element interpolation is enabled (interpolation field 1904 is 001). As in FIG. 26, each of the four indices of vector source index register 2102 recalls a data element from a corresponding table. FIG. 32 illustrates these are placed in destination register 2120 differently than in FIG. 26. In particular, 2 data elements are returned for each of the four indices: the data element recalled by a particular index and the next adjacent data element (regardless of row boundaries). For example, if the data element recalled by a particular index is A0, then the next adjacent data element is A1; if the data element recalled by a particular index is A7, then the next adjacent data element is A8 although A8 is on a different row.

Each recalled data element is stored in a slot in destination register 2120. In accordance with the operation of this look up table read instruction where 2-element interpolation is enabled, the indexed data element in table 1 2611 (A5) and its next adjacent data element (A6) are stored in first and second data slots in destination register 2120. The indexed data element in table 2 2612 (B1) and its next adjacent data element (B2) are stored in third and fourth data slots in destination register 2120. The indexed data element in table 3 2613 (C8) and its next adjacent data element (C9) are stored in fifth and sixth data slots in destination register 2120. The indexed data element in table 4 2614 (D10) and its next adjacent data element (D11) are stored in a seventh and eighth data slots in destination register 2120. In accordance with this example implementation, other data slots of destination register 2120 are zero filled.

Figure 33:
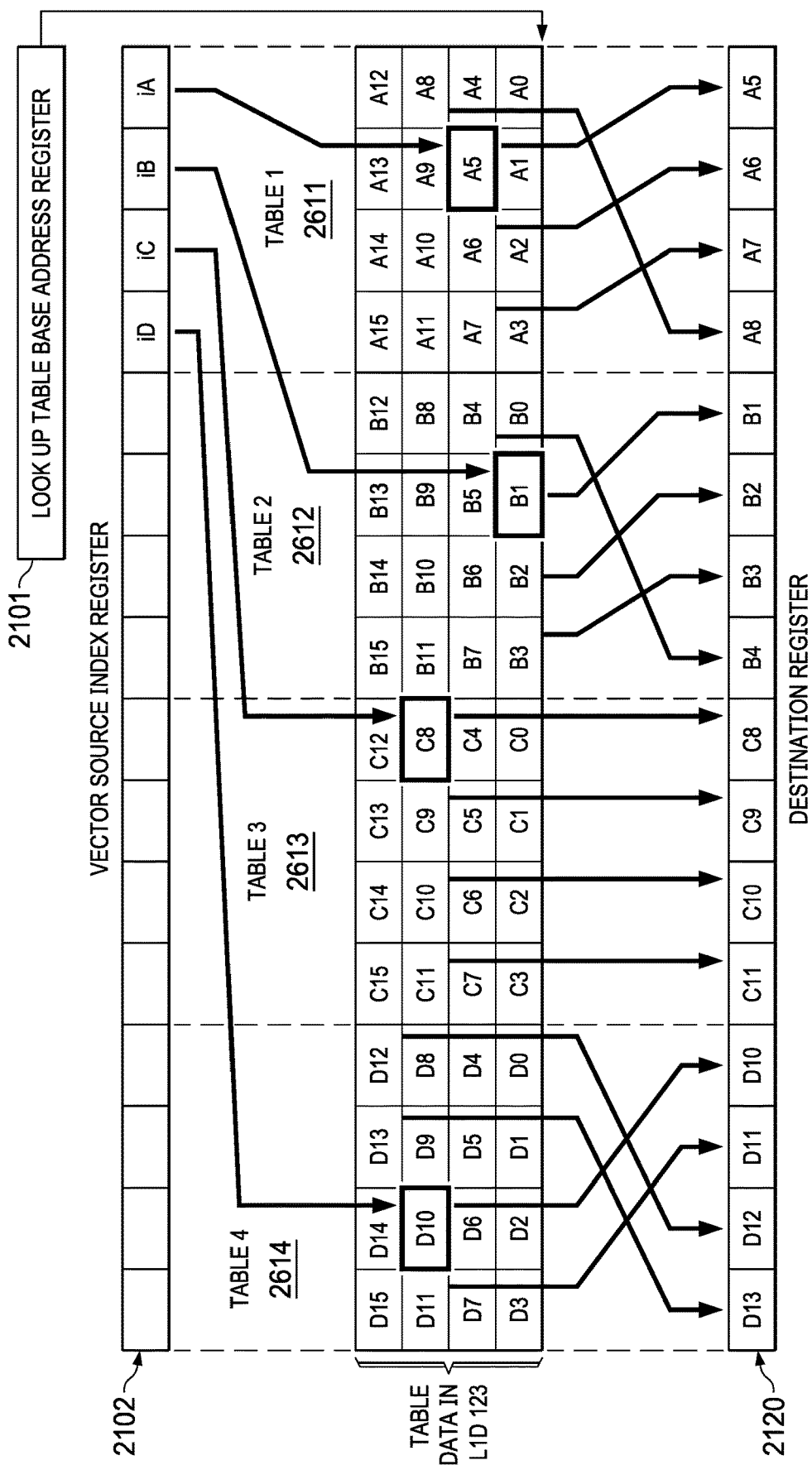
FIG. 33 illustrates an example of the operation of the look up table read instruction for four parallel tables, a data element size of word, and 4-element interpolation in accordance with an example embodiment.

FIG. 33 illustrates an example of the operation of the look up table read instruction in accordance with an example embodiment. FIG. 33 illustrates an operation similar to FIG. 32 except that a 4-element interpolation is enabled (interpolation field 1904 is 010). As in FIG. 32, each of four indices of vector source index register 2102 recalls a data element from each table. FIG. 33 illustrates these are placed in destination register 2120 differently than in FIG. 32. In particular, 4 data elements are returned for each of the four indices: the data element recalled by a particular index and the next 3 adjacent data elements (regardless of row boundaries). For example, if the data element recalled by a particular index is A0, then the next 3 adjacent data elements are A1-A3; if the data element recalled by a particular index is A7, then the next 3 adjacent data elements are A8-A10, although A8-A10 are on a different row.

Each recalled data element is stored in a slot in destination register 2120. In accordance with the operation of this look up table read instruction where 4-element interpolation is enabled, the indexed data element in table 1 2611 (A5) and its next 3 adjacent data elements (A6-A8) are stored in the first 4 data slots in destination register 2120. The indexed data element in table 2 2612 (B1) and its next 3 adjacent data elements (B2-B4) are stored in the second 4 data slots in destination register 2120. The indexed data element in table 3 2613 (C8) and its next 3 adjacent data elements (C9-C11) are stored in the third 4 data slots in destination register 2120. The indexed data element in table 4 2614 (D10) and its next 3 adjacent data elements (D11-D13) are stored in the fourth 4 data slots in destination register 2120. In this example, where the data element size is word, the 16 recalled data elements completely fill the destination register 2120; however, in an otherwise-similar example where the data element size is instead half-word or byte, the 16 recalled data elements would not completely fill the destination register 2120 and the remainder of data slots of destination register 2120 are zero filled.

Those skilled in the art would understand how to apply the principles described in this disclosure to other numbers of look up tables within the selected set of tables. For example, 8-element interpolation is not possible when the number of tables is 4 and the tables are arranged in level one data cache 123 in the manner shown in FIG. 33, since only one element per memory bank is accessible at a time. However, 8-element interpolation is possible when the number of tables is 2 or 1.

Figure 34:
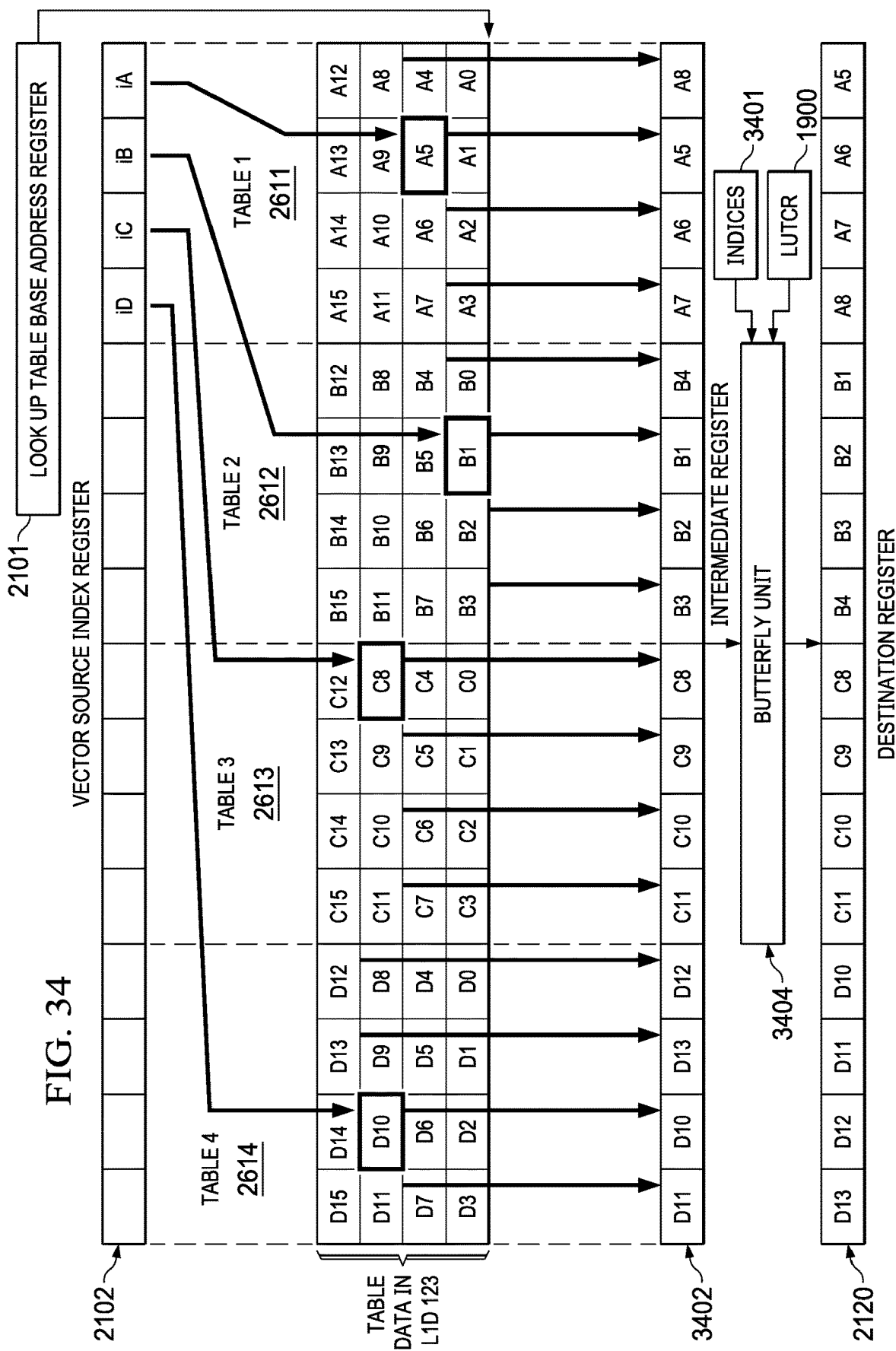
FIG. 34 illustrates an example of the operation of a multi-stage butterfly unit to reorder data from a look up table prior to writing the reordered data to a destination register in response to execution of a look up table read instruction in accordance with an example embodiment.

FIG. 34 illustrates an example embodiment of implementation of interpolation, discussed above. In the example of FIG. 34, an intermediate register 3402 receives table data recalled from level one data cache 123. In this example, the level one data cache 123 that contains the tables 2611, 2612, 2613, 2614 is configured to provide a word of data from each of its 16 banks (described above) regardless of the data requested by a look up read instruction. The data provided to the intermediate register 3402 is ordered as it appears in the 16 banks of the level one data cache 123, regardless of interpolation or other variables specified by the look up table configuration register 1900.

Continuing the example of FIG. 33, in which the look up table read instruction includes 4-element interpolation, the intermediate register 3402 contains each of the four indexed data elements (e.g., A5, B1, C8, D10) and the next 3 adjacent data elements from each of the indexed data elements. However, as explained above, the intermediate register 3402 contains these data elements ordered as they appear in the 16 banks of the level one data cache 123, and thus not necessarily in numerical order of the data elements as shown in the destination register 2120 in FIG. 33 above.

For example, the four elements from Table 1 2611 (A5-A8) appear in the order A8, A5, A6, A7, since this is the order in which those elements appear in the first four banks of the level one data cache 123. On the other hand, the four elements from Table 3 2613 (C8-C11) appear in order in the intermediate register 3402 since the element C8 is already in the lowest bank of the level one data cache 123 corresponding to Table 3 2613.

In order to facilitate proper ordering of data elements written to the destination register 2120, explained above with respect to FIG. 33, examples of this disclosure include a multi-stage butterfly unit 3404, which receives the intermediate register 3402 as an input and produces an output that is written to the destination register 2120. The butterfly unit 3404 is configured to reorder the bits of the intermediate register 3402 according to various control signals. These control signals include, but are not necessarily limited to, all or a portion of the addresses that correspond to the indexed data elements in each of the tables 2611, 2612, 2613, 2614. For example, decoding the indices 3401 (or portions of the addresses of the indexed data elements) indicates the position of an indexed data element within a table and thus whether reordering may be necessary. In the present example, an address of the indexed data element A5 indicates A5 is not aligned with the lowest bank of the level one data cache 123 corresponding to Table 1 2611, and thus the bits of the intermediate register 3402 corresponding to Table 1 2611 should be reordered. On the other hand, an address of the indexed data element C8 indicates C8 is aligned with the lowest bank of the level one data cache 123 corresponding to Table 3 2613, and thus the bits of the intermediate register 3402 corresponding to Table 3 2613 need not be reordered.

To further facilitate proper ordering of data elements written to the destination register 2120, the multi-stage butterfly unit 3404 also receives all or portions of the look up table configuration register 1900 as control signal(s). In particular, the interpolation field 1904, the element size field 1907, and the number of tables field 1908 may influence the function of the multi-stage butterfly unit 3404. While FIG. 34 is meant to illustrate how the butterfly unit 3404 processes a set of data elements from the look up tables 2611, 2612, 2613, 2614 in accordance with the example shown in in FIG. 34, the butterfly unit 3404 can process the data elements in accordance with a number of different possible settings in the look up table configuration register 1900. Additional examples of the butterfly unit 3404 functionality are provided below.

In a first example, the control signals from the look up table configuration register 1900 provided to the multi-stage butterfly network 3404 include the element size field 1907 indicating a size of word, the interpolation field 1904 indicating no interpolation, and the number of tables field 1908 indicating two tables. In this example, the multi-stage butterfly network 3404 receives one indexed element from each group of banks 1-8 and banks 9-16 of the level one data cache 123, for example according to the two-table embodiment shown in FIG. 22. Thus, in response to these control signals from the look up table configuration register 1900, the multi-stage butterfly network 3404 places the indexed elements from each group of banks 1-8 and banks 9-16 in the first two word-size lanes of the destination register 2120, respectively. In one example, the remaining lanes of the destination register 2120 are zero-filled, while in other examples the remaining lanes of the destination register may be filled in different manners.

In a second example, the control signals from the look up table configuration register 1900 provided to the multi-stage butterfly network 3404 include the element size field 1907 indicating a size of word, the interpolation field 1904 indicating 2-element interpolation, and the number of tables field 1908 indicating two tables. In this example, the multi-stage butterfly network 3404 receives one indexed element and a next adjacent element (e.g., according to 2-element interpolation, explained above) from each group of banks 1-8 and banks 9-16 of the level one data cache 123. Thus, in response to these control signals from the look up table configuration register 1900, the multi-stage butterfly network 3404 places the indexed element and the next adjacent element from the group of banks 1-8 in order in the first two word-size lanes of the destination register 2120. Similarly, the multi-stage butterfly network 3404 places the indexed element and the next adjacent element from the group of banks 9-16 in order in the second two word-size lanes of the destination register 2120. In one example, the remaining lanes of the destination register 2120 are zero-filled, while in other examples the remaining lanes of the destination register may be filled in different manners.

In a third example, the control signals from the look up table configuration register 1900 provided to the multi-stage butterfly network 3404 include the element size field 1907 indicating a size of word, the interpolation field 1904 indicating 8-element interpolation, and the number of tables field 1908 indicating two tables. In this example, the multi-stage butterfly network 3404 receives one indexed element and a next 7 adjacent elements (e.g., according to 8-element interpolation) from each group of banks 1-8 and banks 9-16 of the level one data cache 123. As explained above, the next 7 adjacent elements may wrap into a subsequent row. Thus, in response to these control signals from the look up table configuration register 1900, the multi-stage butterfly network 3404 places the indexed element and the next 7 adjacent elements from the group of banks 1-8 in order in the first eight word-size lanes of the destination register 2120. Similarly, the multi-stage butterfly network 3404 places the indexed element and the next 7 adjacent elements from the group of banks 9-16 in order in the second eight word-size lanes of the destination register 2120. In this example, assuming a 512-bit destination register 2120, all lanes are filled by the read operation and thus no additional filling is required.

Extensions of the above-described functionality of the multi-stage butterfly network 3404 in response to different combinations of control signals from the look up table configuration register 1900 should be apparent to one of ordinary skill in the art. For example, changes to the number of tables field 1908 affects the "boundaries" on which elements may be reordered before writing to the destination register 2120 (e.g., the number of tables field 1908 indicating four tables results in "boundaries" between groups of banks 1-4, 5-8, 9-12, and 13-16, while the number of tables field 1908 indicating eight tables results in "boundaries" between groups of banks 1-2, 3-4, 5-6, 7-8, 9-10, 11-12, 13-14, and 15-16). As another example, changes to the element size field 1907 affect how bits from the intermediate register 3402 are packed into the destination register 2120.

Below is the form of a look up table write (LUTWR) instruction in accordance with one example embodiment.

LUTWR tbl_index, tbl_set, write_data

Tbl_index is an instruction operand specifying a vector register (such as within general vector register file 231) by register number. This is interpreted as index numbers as shown in Table 11, above. Tbl_set is a number [0:3] specifying the table set employed in the instruction. This named table set number specifies: a corresponding look up table base address register storing the table base address, which may be a scalar register or a vector register; a corresponding look up table configuration register (FIG. 19), which may a scalar register or a vector register; and the corresponding operative portion of the look up table enable register (FIG. 20), which may a scalar register or a vector register. The look up table base address register corresponding to the named table set determines the base address of the table set. The indices of the vector register named by Tbl_index are offset from this table set base address. The look up table configuration register corresponding to the named table set determines: the promotion mode (Table 4); the amount of memory allocated to the table size (Table 5); the weight size for histogram operations (Table 6); n-element interpolation for look up table read operations (Table 7); whether values are to be treated as signed or unsigned; whether histogram bin entries are saturated to min/max values; the data element size (Table 8); and the number of tables in the table set (Table 9). Write_data is an instruction operand, specifically a source operand, specifying a vector register (such as within general vector register file 231) by register number to provide source data to be written to the look up tables. As above, the number of tables, size of the elements, and other parameters are specified in the look up table configuration register 1900.

Figure 35:
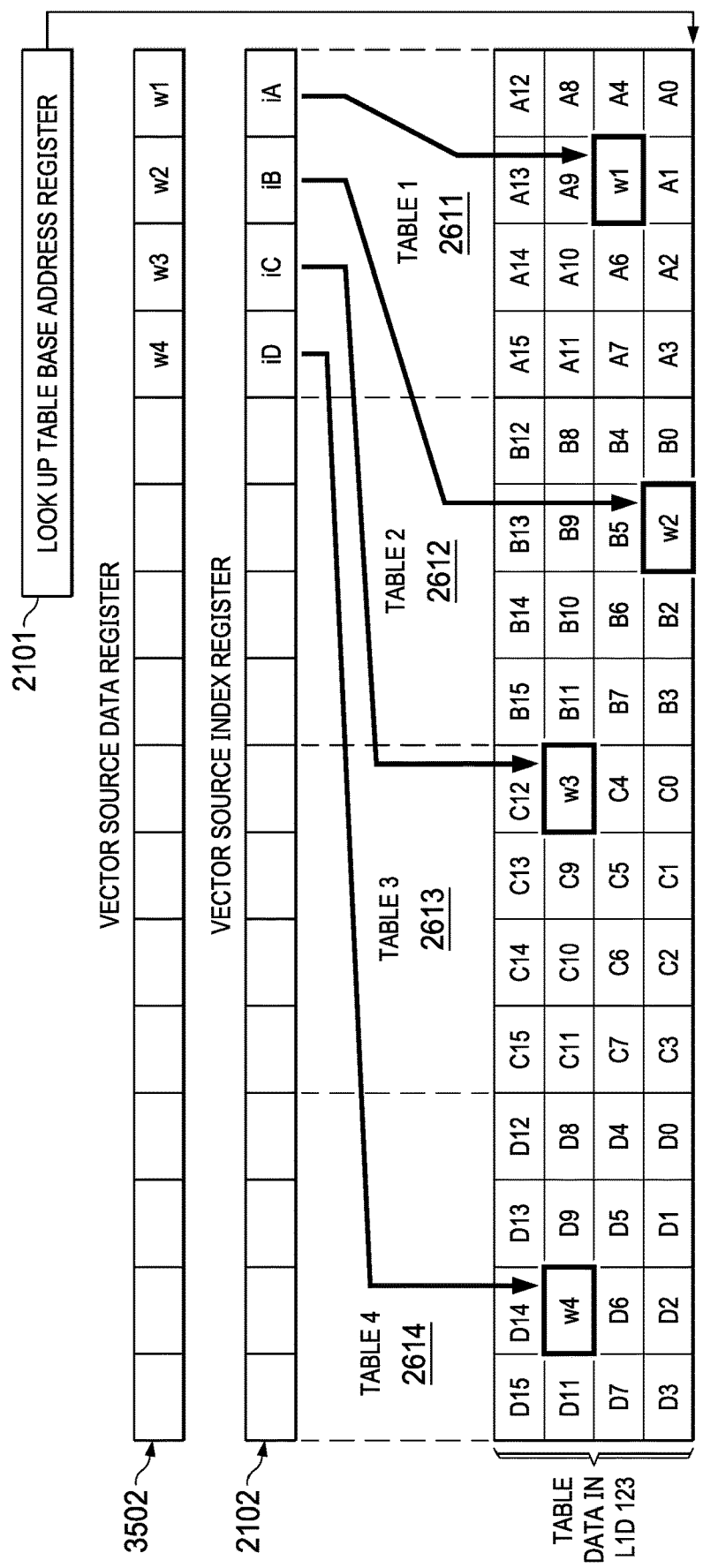
FIG. 35 illustrates an example of the operation of a look up table write instruction for four parallel tables with a data element size of word in accordance with an example embodiment.

FIG. 35 illustrates an example of the operation of the look up table write instruction of this disclosure. In the example illustrated in FIG. 35, the corresponding look up table configuration register (1900) specifies four parallel tables and a data element size of word (32 bits). To perform look up table operations, the look up table enable register field (in register 2000) corresponding to the selected table set must enable both read and write operations (11).

As above, the look up table base address register 2101 corresponding to the specified table set stores the base address for the look up table set as illustrated schematically in FIG. 35. The table data is stored in a portion of level one data cache 123 configured as directly accessible memory.

The example illustrated in FIG. 35 has four tables: table 1 2611; table 2 2612; table 3 2613; and table 4 2614. As shown in Table 11, this instruction with these selected options treats the data stored in vector source index register 2102 as a set of 4 32-bit fields specifying table offsets. The first field (bits Vx[31:0]) stores iA, the index into the first table 2611. In this example, this indexes to element A5 (e.g., between A4 and A6). The second field (bits Vx[63:32]) stores iB, the index into the second table 2612. In this example, this indexes to element B1 (e.g., between B0 and B2). The third field (bits Vx[95:64]) stores iC, the index into the third table 2613. In this example, this indexes to element C8 (e.g., between C7 and C9). The fourth field (bits Vx[127:96]) stores iD, the index into the fourth table 2614. In this example, this indexes to element D10 (e.g., between D9 and D11). The various indices are the memory address offsets from the base address for the table set to the specified data element to be written.

A vector source data register 3502 contains data to be written to the indexed data elements of the look up tables 2611, 2612, 2613, 2614. In this example, because the look up table configuration register specifies a number of tables of four and an element size of word, the first four words of the vector source data register 3502 are utilized by the look up table write instruction, while the remainder of the vector source data register 3502 is not utilized by the look up table write instruction. In particular, the first word (W1) is written to the element specified by the index iA, or A5; the second word (W2) is written to the element specified by the index iB, or B1; the third word (W3) is written to the element specified by the index iC, or C8; and the fourth word (W4) is written to the element specified by the index iD, or D10.

Extensions of the above-described look up table write instruction in response to different parameters specified by the look up table configuration register 1900 should be apparent to one of ordinary skill in the art. For example, changes to the number of tables field 1908 affects the number of indexes specified by the vector source index register 2102 (e.g., as shown in FIGS. 21-25). Similarly, changes to the element size field 1907 affects the portion of the vector source data register 3502 that provides source data to be written to the indexed data elements of the look up tables.

Below is the form of a look up table initialization (LUTINIT) instruction in accordance with one example embodiment.

LUTINIT tbl_index, tbl_set, write_data

Tbl_index, tbl_set, and write_data are generally similar to those described above with respect to the look up table write instruction. As above, the number of tables, size of the elements, and other parameters are specified in the look up table configuration register 1900. Unlike the look up table write instruction, which writes source data only to an indexed element in each table (tables 2611, 2612, 2613, 2614 in the example of FIG. 35), the look up table initialization instruction duplicates source data to more efficiently write to larger portions of the look up tables. As suggested by the instruction name, such duplication of source data is particularly useful when initializing elements of look up tables to particular values.

The look up table initialization instruction specifies source data for a single table (e.g., the vector source index register 2102 contains only a single index, for example in the first field (bits Vx[31:0])). The source data specified by the vector source data register 3502 varies in size depending on the number of tables specified by the look up table configuration register 1900. In response to execution of a look up table initialization instruction, the level one data cache 123 replicates the source data internally, based on the number of tables specified by the look up table configuration register 1900, and writes the resulting replicated data to the location specified by the index value in the vector source index register 2102 and the look up table base address register 2101. The duplicated data is written to the location specified by the index value in the vector source index register 2102 along with corresponding locations in each of the other tables in the table set.

Figure 36A:
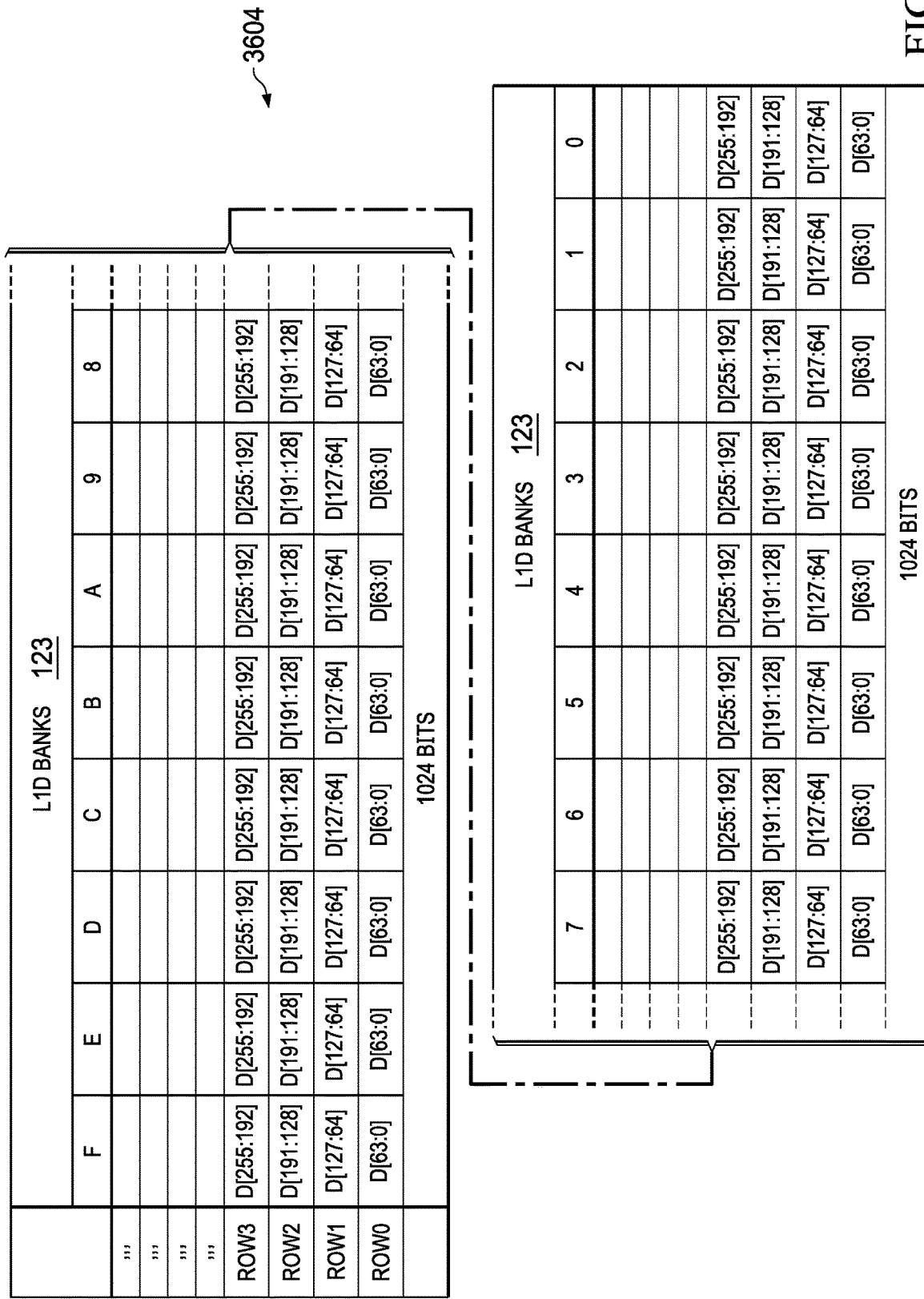
FIGS. 36A and 36B illustrate examples of the operation of a look up table initialization instruction in accordance with example embodiments.
Figure 36B:
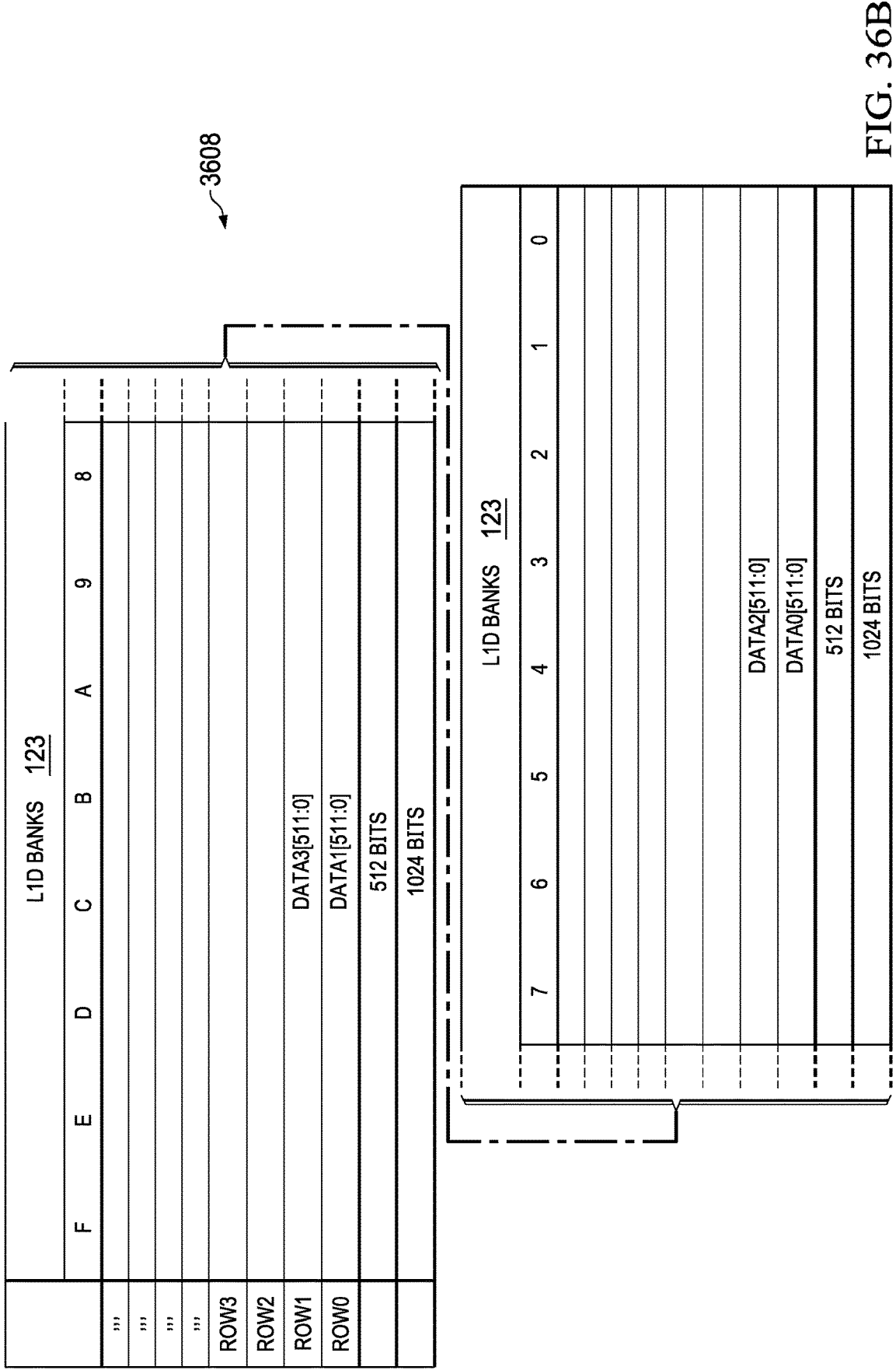

FIGS. 36A and 36B show examples of the initialization of the level one data cache 123 resulting from execution of exemplary look up table initialization instructions. In the example of FIG. 36A, the number of tables is 16 and the element size is word. The following are the exemplary look up table initialization instructions, the execution of which results in the example population 3604 of the level one data cache 123:

LUTINIT D0, 0, B0; where D0=0x00 (e.g., the index of the element in row 0, level one data cache 123 bank 0), 0 is the specified table set, B0=D[63:0]

LUTINIT D1, 0, B1; where D1=0x02 (e.g., the index of the element in row 1, level one data cache 123 bank 0), 0 is the specified table set, B1=D[127:64]

LUTINIT D2, 0, B2; where D2=0x04 (e.g., the index of the element in row 2, level one data cache 123 bank 0), 0 is the specified table set, B2=D[191:128]

LUTINIT D3, 0, B3; where D3=0x06 (e.g., the index of the element in row 3, level one data cache 123 bank 0), 0 is the specified table set, B3=D[255:192]

As explained above, the source data specified by the vector source data register 3502 varies in size depending on the number of tables specified by the look up table configuration register 1900. In this example, the level one data cache has a width of 1024 bits and there are 16 tables, and thus each table is 64 bits wide. The registers B0-B3 are scalar registers, also having a size of 64 bits, and thus the entire contents of the registers B0-B3 are utilized by the look up table initialization instructions. In another example, the source data register is the vector source data register 3502, and thus only a portion of the contents of the register (e.g., the first 64 bits) is utilized by the lookup table initialization instruction.

The first look up table initialization instruction results in 64 bits of source data from register B0 being written to each of the 16 tables in the table set 0, beginning at the location specified by the index 0x00 (plus a base address from the look up table configuration register 1900), which is the first element in row 0. The second look up table initialization instruction results in 64 bits of source data from register B1 being written to each of the 16 tables in the table set 0, beginning at the location specified by the index 0x02 (plus the base address from the look up table configuration register 1900), which is the first element in row 1. The third look up table initialization instruction results in 64 bits of source data from register B2 being written to each of the 16 tables in the table set 0, beginning at the location specified by the index 0x04 (plus the base address from the look up table configuration register 1900), which is the first element in row 2. The fourth look up table initialization instruction results in 64 bits of source data from register B3 being written to each of the 16 tables in the table set 0, beginning at the location specified by the index 0x06 (plus the base address from the look up table configuration register 1900), which is the first element in row 3.

As will be explained further below, in the example of FIG. 36A, since there are 16 tables and the element size is word, there are two words per row per table. The permitted index values (e.g., in registers D0-D3) correspond to the first element of each row, and thus also increase by two (e.g., 0x00, 0x02, 0x04, 0x06, and so on). If the element size was, instead, half word, there would be four half words per row per table, and the permitted index values would increase by four (e.g., 0x00, 0x04, 0x08, 0x0C, and so on). Similarly, if the element size was, instead, byte, there would be eight bytes per row per table, and the permitted index values would increase by eight (e.g., 0x00, 0x08, 0x10, 0x18, and so on). This convention is reflected in the following Table 13, which provides an example of row addressing for each supported number of tables ("ways" in Table 13) and element size configuration. Such row addressing may be employed by successive look up table initialization instructions to populate an entire look up table, with subsequent initialization instructions specifying the index of the first element in the row that is being populated.

TABLE 13

| No of Ways | Element type | Index for LUTINT |
|---|---|---|
| 16 | word | 0x8, 0x2, 0x4, 0x6, 0x8, 0xA, 0xC, 0xE, . . . |
|  | halfword | 0x0, 0x4, 0x8, 0xC, 0x10, 0x14, 0x18, 0x1C, . . . |
|  | byte | 0x0, 0x8, 0x10, 0x18, 0x20, 0x28, 0x30, 0x38, 0x40, . . . |
| 8 | word | 0x0, 0x4, 0x8, 0xC, 0x10, 0x14, 0x18, 0x1C, . . . |
|  | halfword | 0x0, 0x8, 0x10, 0x18, 0x20, 0x28, 0x30, 0x38, 0x40, . . . |
|  | byte | 0x0, 0x10, 0x20, 0x30, 0x40, 0x50, 0x60, 0x70, 0x80, . . . |
| 4 | word | 0x0, 0x8, 0x10, 0x18, 0x20, 0x28, 0x30, 0x368, 0x40, . . . |
|  | halfword | 0x0, 0x10, 0x20, 0x30, 0x40, 0x50, 0x60, 0x70, 0x80, . . . |
|  | byte | 0x0, 0x20, 0x40, 0x60, 0x80, 0x0, 0xC0, 0xE0, 0x100, . . . |
| 2 | word | 0x0, 0x10, 0x20, 0x30, 0x40, 0x50, 0x60, 0x70, 0x80, . . . |
|  | halfword | 0x0, 0x20, 0x40, 0x60, 0x80, 0x0, 0xC0, 0xE0, 0x100, . . . |
|  | byte | 0x0, 0x40, 0x80, 0xC0, 0x100, 0x140, 0x180, 0x1C0, 0x200, 0x240, . . . |
| 1 | word | 0x0, 0x10, 0x20, 0x30, 0x40, 0x50, 0x60, 0x70, 0x80, . . . |
|  | halfword | 0x0, 0x20, 0x40, 0x60, 0x80, 0x0, 0xC0, 0xE0, 0x100, . . . |
|  | byte | 0x0, 0x40, 0x80, 0xC0, 0x100, 0x140, 0x180, 0x1C0, 0x200, 0x240, . . . |

In the example of FIG. 36B, the number of tables is 1 and the element size is byte. The following are the exemplary look up table initialization instructions, the execution of which results in the example population 3608 of the level one data cache 123:

LUTINIT D0, 0, VB0; where D0=0x00 (e.g., the index of the element in row 0, level one data cache 123 bank 0), 0 is the specified table set, VB3=DATA0[511:0]

LUTINIT D1, 0, VB1; where D1=0x40 (e.g., the index of the element in row 0, level one data cache 123 bank 8), 0 is the specified table set, VB1=DATA1[511:0]

LUTINIT D2, 0, VB2; where D2=0x80 (e.g., the index of the element in row 1, level one data cache 123 bank 0), 0 is the specified table set, VB2=DATA2[511:0]

LUTINIT D3, 0, VB3; where D3=0xC0 (e.g., the index of the element in row 1, level one data cache 123 bank 8), 0 is the specified table set, VB3=DATA3[511:0]

As explained above, the source data specified by the vector source data register 3502 varies in size depending on the number of tables specified by the look up table configuration register 1900. In this example, the level one data cache 123 has a width of 1024 bits and there is one table, which has a maximum width of one vector, or 512 bits, and thus each row of the level one data cache 123 contains two rows of the table. Since there is only one table, no duplication occurs. The registers VB0-VB3 are vector registers, also having a size of 512 bits, and thus the entire contents of the registers VB0-VB3 are utilized by the look up table initialization instructions.

The first look up table initialization instruction results in 512 bits of source data from register VB0 being written to the table in the table set 0, at the location specified by the index 0x00 (plus a base address from the look up table configuration register 1900), which is the first element in row 0. The second look up table initialization instruction results in 512 bits of source data from register VB1 being written to the table in the table set 0, at the location specified by the index 0x40 (plus the base address from the look up table configuration register 1900), which is the 65th element in row 0 (e.g., the first element in bank 8). The third look up table initialization instruction results in 512 bits of source data from register VB2 being written to the table in the table set 0, at the location specified by the index 0x80 (plus the base address from the look up table configuration register 1900), which is the first element in row 1. The fourth look up table initialization instruction results in 512 bits of source data from register VB3 being written to the table in the table set 0, at the location specified by the index 0xC0 (plus the base address from the look up table configuration register 1900), which is the 65th element in row 1 (e.g., the first element in bank 8).

As explained, the level one data cache 123 has a bandwidth of 1024 bits, although the data bus (e.g., 144) between the central processing unit core 110 and the level one data cache 123 is only 512 bits in the example embodiment shown in FIG. 1. Thus, 512 bits is the maximum size of write_data able to be provided to the level one data cache 123 (e.g., from vector source data register 3502). Duplication is not supported in the example where the number of tables is 1, since there is not another table into which to write duplicated source data. In an example, the look up table initialization instruction when the number of tables is 1 provides the same bandwidth as a look up table write instruction (or a vector store), described above. However, for number of tables equal to 2, 4, 8, or 16, the write_data from the vector source data register 3502 is duplicated according to the following Table 14.

TABLE 14

| No of Ways | Element type | Data Send Out (bits) | Data Written to L1D SRAM (bits) | Expansion Factor |
|---|---|---|---|---|
| 16 | word | 64 | 1024 | 16 |
|  | halfword | 64 | 1024 | 16 |
|  | byte | 64 | 1024 | 16 |
| 8 | word | 128 | 1024 | 8 |
|  | halfword | 128 | 1024 | 8 |
|  | byte | 128 | 1024 | 8 |
| 4 | word | 256 | 1024 | 4 |
|  | halfword | 256 | 1024 | 4 |
|  | byte | 256 | 1024 | 4 |
| 2 | word | 512 | 1024 | 2 |
|  | halfword | 512 | 1024 | 2 |
|  | byte | 512 | 1024 | 2 |
| 1 | word | 512 | 512 | 1 |
|  | halfword | 512 | 512 | 1 |
|  | byte | 512 | 512 | 1 |

As demonstrated, depending on the number of tables specified by the look up table configuration register 1900, the portion of the vector source data register 3502 that is sent to the level one data cache 123 to be duplicated varies, for example from 64 bits when the number of tables is 16 to 512 bits when the number of tables is 2 (duplication allowed) or 1 (duplication not allowed). Further, as explained with respect to FIG. 36A, in the example where there are 16 tables, resulting in a table width of 64 bits, a scalar register may also contain the source data to be written to the tables. However, in other examples a scalar register cannot be used as the source register since more than 64 bits are needed (e.g., for 8-, 4-, 2-, and 1-table examples).

Below is the form of a histogram (HIST) instruction and a weighted histogram (WHIST) instruction in accordance with one example embodiment.

HIST hist_index, hist_set
WHIST hist_index, hist_set, hist_weights

Hist_index is an instruction operand specifying a vector register (such as within general vector register file 231) by register number. This is interpreted as index numbers as shown in Table 11, above. Hist_index is similar to Tbl_index discussed above, but particularly for the histogram context rather than the look up table context. Similarly, Hist_set is a number [0:3] specifying the histogram set employed in the instruction. This named histogram set number specifies: a corresponding look up table (or histogram) base address register storing the base address of the set of histograms, which may be a scalar register or a vector register; a corresponding look up table (or histogram) configuration register (FIG. 19), which may be a scalar register or a vector register; and the corresponding operative portion of the look up table (or histogram) enable register (FIG. 20), which may be a scalar register or a vector register. The base address register corresponding to the named histogram set determines the base address of the histogram set. The indices of the vector register named by Hist_index are offset from this table set base address. The look up table configuration register corresponding to the named table set determines: the promotion mode (Table 4); the amount of memory allocated to the table size (Table 5); the weight size for histogram operations (Table 6); n-element interpolation for look up table read operations (Table 7); whether values are to be treated as signed or unsigned; whether histogram bin entries are saturated to min/max values; the data element size (Table 8); and the number of histograms in the histogram set (Table 9). For weighted histogram (WHIST) instructions, hist_weights is an instruction operand specifying a vector register (such as within general vector register file 231) by register number to provide weights to increment addressed bin entries in the histograms. Similar to above, the number of histograms, size of the bin entries, size of weights, whether saturation is employed, and other parameters are specified in the configuration register 1900.

Figure 37:
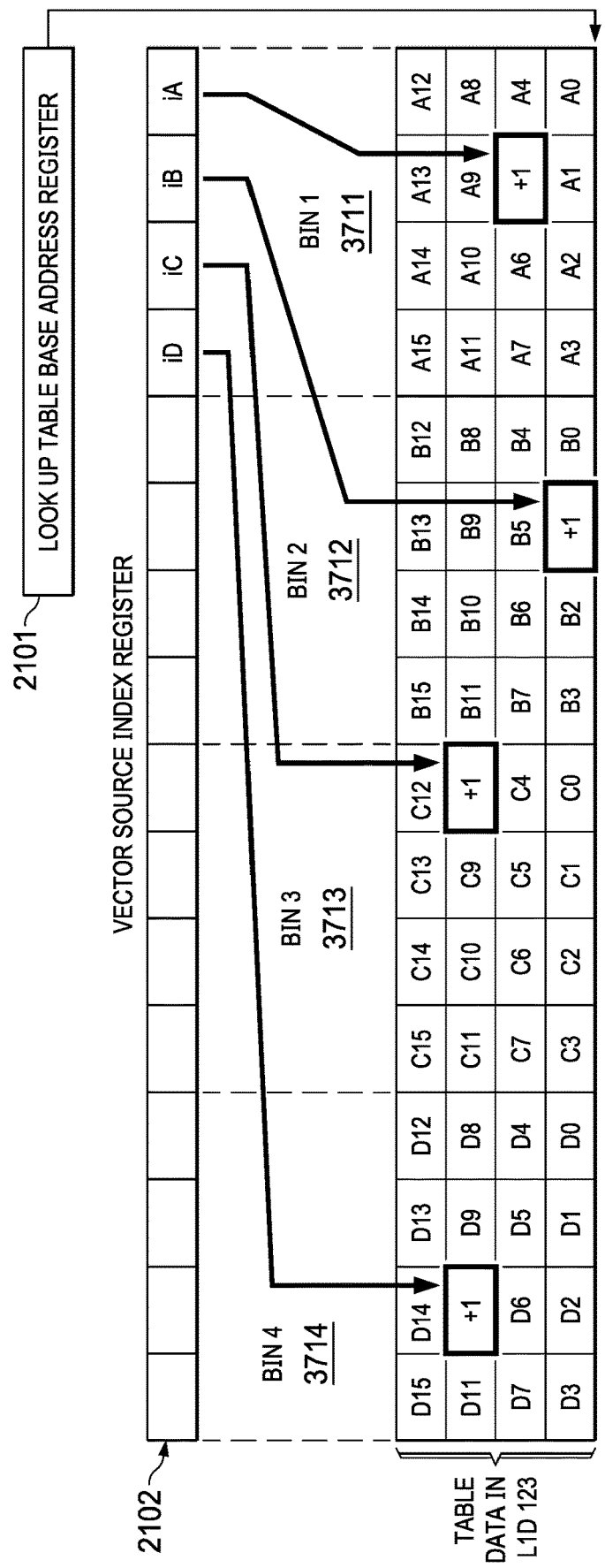
FIG. 37 illustrates an example of the operation of a histogram instruction for four parallel histograms in accordance with an example embodiment.

FIG. 37 illustrates an example of the operation of the histogram instruction of this disclosure. In the example illustrated in FIG. 37, the corresponding configuration register (1900) specifies four parallel histograms 3711, 3712, 3713, 3714 and a data element size of word (32 bits). To perform histogram operations, the enable register field (in register 2000) corresponding to the selected histogram set should enable both read and write operations (11).

As above, the base address register 2101 corresponding to the specified histogram set stores the base address for the histogram set as illustrated schematically in FIG. 37. The histogram data is stored in a portion of level one data cache 123 configured as directly accessible memory.

The example illustrated in FIG. 37 has four histograms: hist 1 3711; hist 2 3712; hist 3 3713; and hist 4 3714. As shown in Table 11, this instruction with these selected options treats the data stored in vector source index register 2102 as a set of 4 32-bit fields specifying table offsets. The first field (bits Vx[31:0]) stores iA, the index into the first histogram 3711. In this example, this indexes to element A5 (e.g., between A4 and A6). The second field (bits Vx[63:32]) stores iB, the index into the second histogram 3712. In this example, this indexes to element B1 (e.g., between B0 and B2). The third field (bits Vx[95:64]) stores iC, the index into the third histogram 3713. In this example, this indexes to element C8 (e.g., between C7 and C9). The fourth field (bits Vx[127:96]) stores iD, the index into the fourth histogram 3714. In this example, this indexes to element D10 (e.g., between D9 and D11). The various indices are the memory address offsets from the base address for the histogram set to the specified bin element to be modified.

In response to execution of a histogram instruction according to the example of FIG. 37, the indexed bin entries specified by the base address register 2101 and the vector source index register 2102 are incremented by a value of 1. The bin entry specified by iA (e.g., A5) is incremented by 1; the bin entry specified by iB (e.g., B1) is incremented by 1; the bin entry specified by iC (e.g., C8) is incremented by 1; and the bin entry specified by iD (e.g., D10) is incremented by 1.

If the saturation field 1905 of the configuration register 1900 is set, then bin entries are saturated (e.g., limited) to min/max values of the element data type in response to the histogram operation. For example, unsigned bytes saturate to [0, 0xFF]; signed bytes saturate to [0x80, 0x7F]; unsigned half-words saturate to [0, 0xFFFF]; signed half-words saturate to [0x8000, 0x7FFF]; unsigned words saturate to [0, 0xFFFF FFFF]; and signed words saturate to [0x8000 0000, 0x7FFF FFFF]. If the saturation field 1905 is 0, then histogram bin entries do not saturate to min/max values of the element data type and instead will wrap around when incremented beyond a maximum value or decremented beyond a minimum value.

Figure 38:
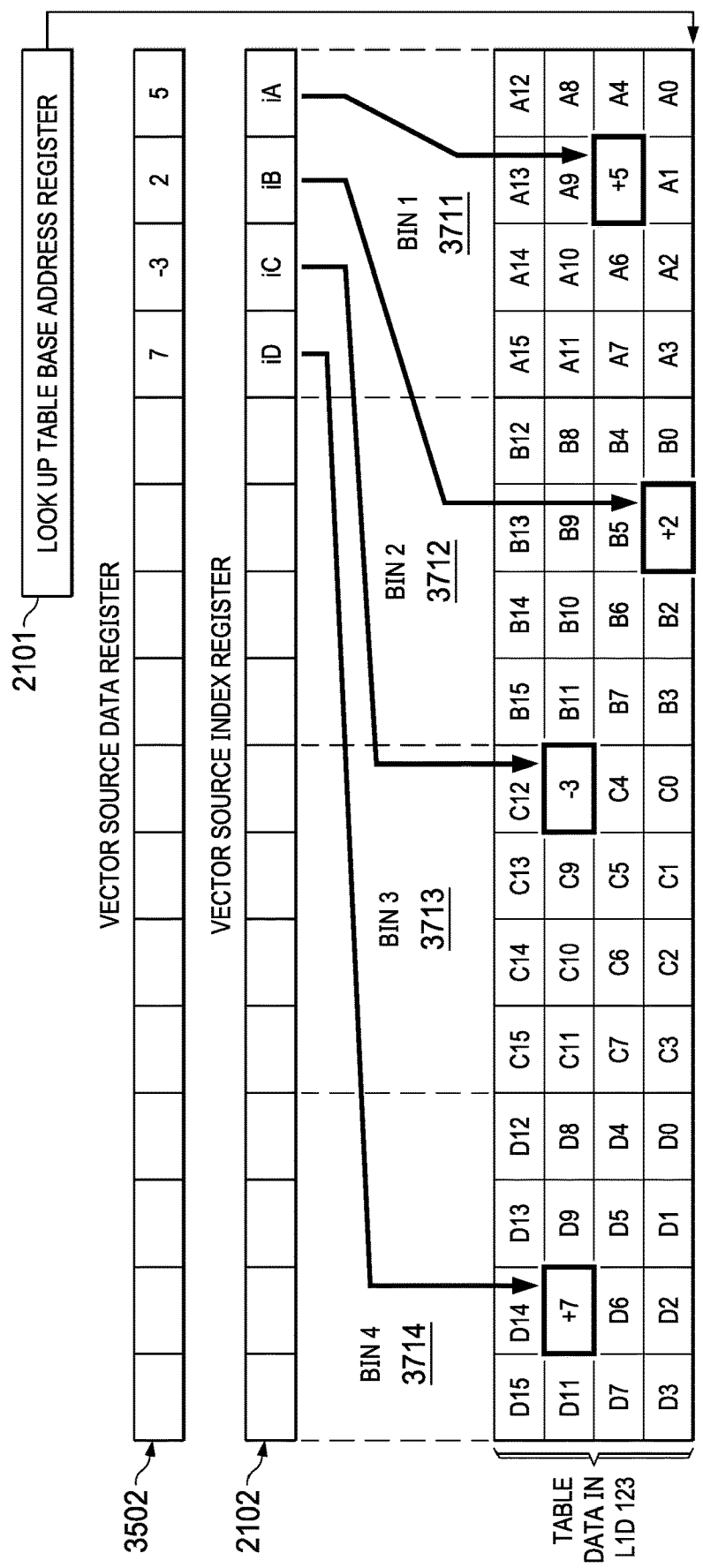
FIG. 38 illustrates an example of the operation of a weighted histogram instruction for four parallel histograms in accordance with an example embodiment.

FIG. 38 illustrates an example of the operation of the weighted histogram instruction of this disclosure. FIG. 38 is similar to FIG. 37, but includes the vector source data register 3502, explained above. The vector source data register 3502 is specified by hist_weights and includes weights to increment addressed bin entries in the histograms 3711, 3712, 3713, 3714.

Unlike above with respect to the look up table write instruction, for weighted histogram instructions, the vector source data register 3502 contains data to be added to the indexed bin entries in the histograms 3711, 3712, 3713, 3714. In some examples, histogram weights are signed values and weight size is limited to byte and half-word. Further, in some examples, weight size cannot be larger than the specified bin entry size. Thus, for byte-size bins, only byte-size weights are permitted; for half-word or word-size bins, byte or half-word size weights are permitted. In certain examples, for word-size bins, word size weights are permitted as well. In this example, because the look up table configuration register specifies a number of histograms of four and a weight size of half-word (which is permitted due to the bin entry size being specified as word-size), the first four half-words of the vector source data register 3502 are utilized by the weighted histogram instruction, while the remainder of the vector source data register 3502 is not utilized by the weighted histogram instruction. In particular, the first half-word (value of +5) is added to the bin entry specified by the index iA (e.g., A5 is incremented by 5); the second half-word (value of +2) is added to the bin entry specified by the index iB (e.g., B1 is incremented by 2); the third half-word (value of −3) is added to the bin entry specified by the index iC (e.g., C8 is decremented by 3); and the fourth half-word (value of +7) is added to the bin entry specified by the index iD (e.g., D10 is incremented by 7).

Similar to the above histogram instruction, if the saturation field 1905 of the configuration register 1900 is set, then bin entries are saturated (e.g., limited) to min/max values of the element data type in response to the histogram operation. For example, unsigned bytes saturate to [0, 0xFF]; signed bytes saturate to [0x80, 0x7F]; unsigned half-words saturate to [0, 0xFFFF]; signed half-words saturate to [0x8000, 0x7FFF]; unsigned words saturate to [0, 0xFFFF FFFF]; and signed words saturate to [0x8000 0000, 0x7FFF FFFF]. If the saturation field 1905 is 0, then histogram bin entries do not saturate to min/max values of the element data type and instead will wrap around when incremented beyond a maximum value or decremented beyond a minimum value.

Extensions of the above-described histogram and weighted histogram instructions in response to different parameters specified by the configuration register 1900 should be apparent to one of ordinary skill in the art. For example, changes to the number of tables (or histograms) field 1908 affects the number of indexes specified by the vector source index register 2102 (e.g., as shown in FIGS. 21-25). Similarly, changes to the weight size field 1903 affects the portion of the vector source data register 3502 that provides source data to be written to the indexed bin entries of the histograms.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An integrated circuit comprising:
   a processor that includes an operational unit; and
   a cache coupled to the operational unit, wherein the operational unit is configured to, in response to an instruction:
   provide a set of data elements to the cache;
   cause the cache to duplicate the set of data elements; and
   cause the cache to store a set of tables that each include a copy of the set of data elements.

2. The integrated circuit of claim 1, wherein:
the processor includes a data register configured to store the set of data elements; and
the operational unit is configured to provide the set of data elements from the data register to the cache.

3. The integrated circuit of claim 2, wherein:
the data register is a first data register;
the processor includes a set of data registers that includes the first data register; and
the instruction specifies the first data register from among the set of data registers.

4. The integrated circuit of claim 1, wherein:
the instruction specifies an index at which to store the set of data elements within each table of the set of tables; and
the operational unit is configured to cause the cache to store the set of data elements within each table of the set of tables at a respective location based on the index.

5. The integrated circuit of claim 4, wherein:
the processor includes an index register configured to store the index; and
the instruction specifies the index by specifying the index register.

6. The integrated circuit of claim 1, wherein:
the set of tables is a first set of tables;
the cache is configured to store a plurality of sets of tables that includes the first set of tables; and
the instruction specifies the first set of tables from among the plurality of sets of tables.

7. The integrated circuit of claim 1, wherein the processor includes a configuration register configured to store a count of tables in the set of tables.

8. The integrated circuit of claim 7, wherein the configuration register is configured to store an element size of the set of tables.

9. The integrated circuit of claim 7, wherein the configuration register is configured to store at least one of: a table size for each table of the set of tables, a signed-or-unsigned indicator, a promotion parameter, an interpolation parameter, a histogram weight size, or a histogram saturation parameter.

10. The integrated circuit of claim 1, wherein the cache is a level-one (L1) cache.

11. The integrated circuit of claim 1, wherein:
the instruction is a first instruction;
the set of data elements is a first set of data elements; and
the operational unit is configured to, in response to a second instruction:
provide a second set of data elements to the cache; and
cause the cache to store a respective data element of the set of data elements in each table of the set of tables.

12. A method comprising:
receiving a table instruction that specifies a set of data elements; and
based on the table instruction:
providing the set of data elements by a processor to a cache;
duplicating the set of data elements by the cache; and
storing a set of tables in the cache such that each table of the set of tables includes the set of data elements.

13. The method of claim 12, wherein:
the processor includes a data register configured to store the set of data elements; and
the providing of the set of data elements includes providing the set of data elements from the data register.

14. The method of claim 13, wherein:
the data register is a first data register;
the processor includes a set of data registers that includes the first data register; and
the table instruction specifies the first data register from among the set of data registers.

15. The method of claim 12, wherein:
the table instruction specifies an index at which to store the set of data elements within each table of the set of tables; and
the storing of the set of tables in the cache is such the set of data elements are stored within each table of the set of tables at a respective location based on the index.

16. The method of claim 15, wherein:
the processor includes an index register configured to store the index; and
the table instruction specifies the index by specifying the index register.

17. The method of claim 12, wherein:
the set of tables is a first set of tables;
the cache is configured to store a plurality of sets of tables that includes the first set of tables; and
the table instruction specifies the first set of tables from among the plurality of sets of tables.

18. The method of claim 12, wherein:
the processor includes a configuration register configured to store a count of tables in the set of tables; and
the cache is configured to store the set of tables having a number of tables based on the count of tables.

19. The method of claim 12, wherein the cache is a level-one (L1) cache.

20. The method of claim 12, wherein:
the table instruction is a first table instruction;
the set of data elements is a first set of data elements; and
the method further comprises:
receiving a second table instruction that specifies a second set of data elements; and
based on the second table instruction:
providing the second set of data elements by the processor to the cache; and
storing a respective data element of the second set of data elements in each table of the set of tables.

\* \* \* \* \*